United States Patent
Lee et al.

(10) Patent No.: US 6,798,489 B2
(45) Date of Patent: Sep. 28, 2004

(54) METHOD FOR FABRICATING A LIQUID CRYSTAL DISPLAY HAVING A PIXEL ELECTRODE WITH DIFFERENT SURFACE ROUGHNESS REGIONS

(75) Inventors: Jeong-Ho Lee, Yongin (KR);
Young-Bae Park, Suwon (KR);
Jeong-Young Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/699,826

(22) Filed: Nov. 4, 2003

(65) Prior Publication Data

US 2004/0125329 A1 Jul. 1, 2004

Related U.S. Application Data

(62) Division of application No. 09/969,998, filed on Oct. 4, 2001, now Pat. No. 6,678,035.

(30) Foreign Application Priority Data

Dec. 20, 2000 (KR) ......................................... 2000-79349

(51) Int. Cl.$^7$ ............................................... G02F 1/13
(52) U.S. Cl. ....................................... 349/187; 349/128
(58) Field of Search .................................. 349/187, 128, 349/129, 130, 134, 136

(56) References Cited

U.S. PATENT DOCUMENTS 5,600,458 A * 2/1997 Okano et al. .................. 349/41
5,691,792 A * 11/1997 Mizushima et al. ........ 349/124

* cited by examiner

Primary Examiner—Robert H. Kim
Assistant Examiner—P. R. Akkapeddi
(74) Attorney, Agent, or Firm—McGuireWoods LLP

(57) ABSTRACT

A liquid crystal display includes a bottom substrate with a gate wire, a data wire and thin transistor, and a top substrate with color filters. In a method for fabricating the liquid crystal display, a pixel electrode is formed on the bottom substrate at each pixel area using a first mask such that the pixel electrode has a first region with a smooth surface, and a second region with a rough surface. A common electrode is formed on the top substrate using a second mask such that the common electrode has a first region with a smooth surface, and a second region with a rough surface. The bottom substrate and the top substrate are assembled together, and a liquid crystal is injected between the bottom and the top substrates.

11 Claims, 39 Drawing Sheets

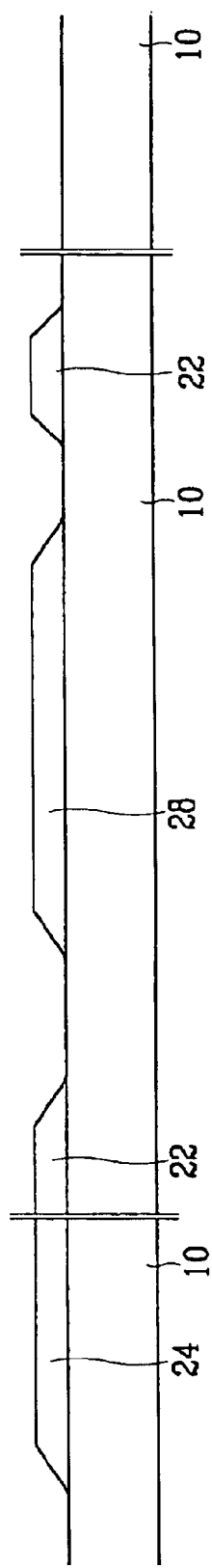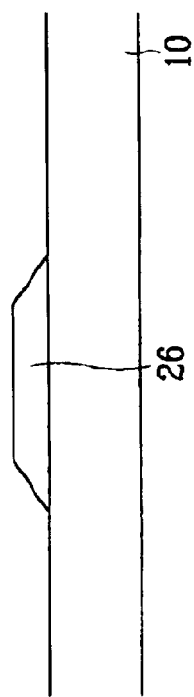
FIG.5B
FIG.5C

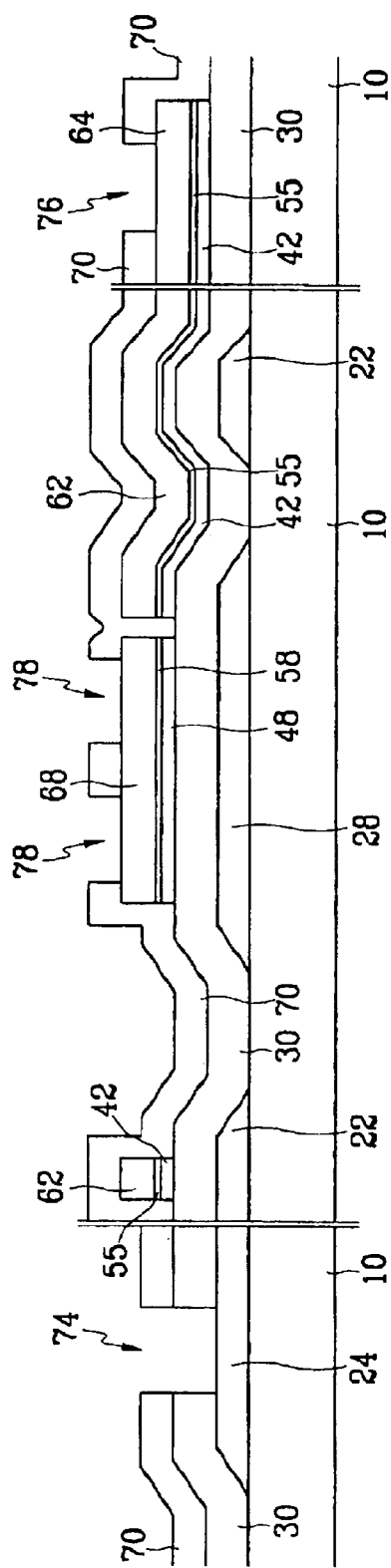

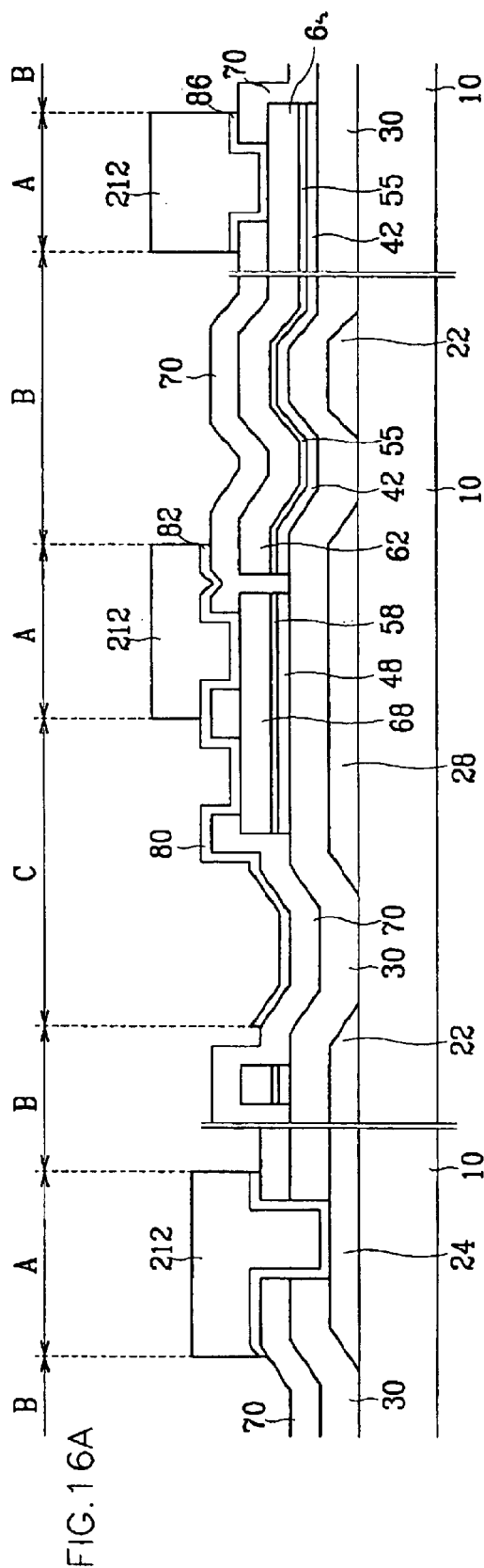
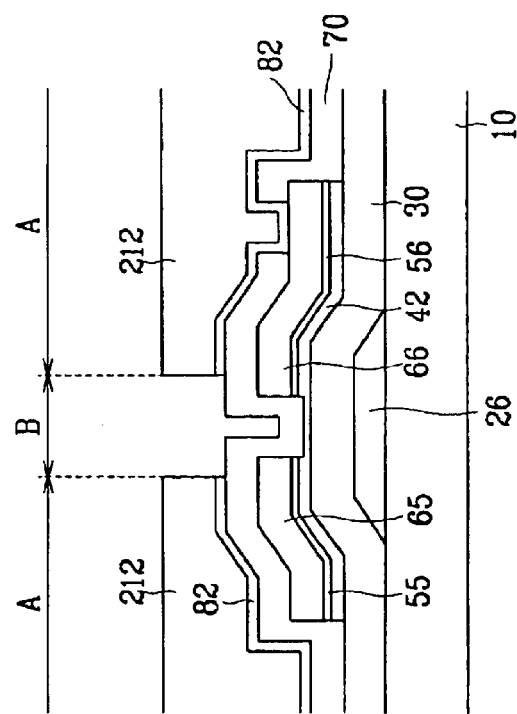
FIG.16A
FIG.16B

METHOD FOR FABRICATING A LIQUID CRYSTAL DISPLAY HAVING A PIXEL ELECTRODE WITH DIFFERENT SURFACE ROUGHNESS REGIONS

This is a divisional application of the U.S. patent application Ser. No. 09/969,998 filed Oct. 4, 2001, now U.S. Pat. No. 6,678,035.

BACKGROUND OF THE INVENTION (a) Field of the Invention

The present invention relates to a liquid crystal display and, more particularly, to a twisted nematic (TN) mode liquid crystal display.

(b) Description of the Related Art

Generally, a liquid crystal display has a structures where a liquid crystal layer is sandwiched between two substrates, and an electric field is applied to the liquid crystal to control light transmission. Of the two substrates, the bottom substrate is provided with thin film transistors and pixel electrode, and the top substrate with a common electrode and color filters.

The twisted nematic (TN) mode has been mainly employed for use in a large size and high definition liquid crystal display because it has the advantages of structural stability and simplified processing steps. In the TN mode liquid crystal displays, the substrates are rubbed for alignment such that the directors of the liquid crystal molecules at the top substrate are perpendicular to those of the liquid crystal molecules at the bottom substrate.

In order to enhance the viewing angle, a multi-domain technique has been developed for the TN mode liquid crystal displays. In the multi-domain liquid crystal display, a number of differently-structured liquid crystal domains are present at one pixel area. Assuming that a group of liquid crystal molecules with the same direction of twisting is referred to as the "domain," the multi-domain liquid crystal display bears multiple groups of liquid crystal molecules at one pixel area.

FIG. 1 illustrates a sectional structure of a two-domain twisted nematic (TDTN) liquid crystal display at one pixel area according to a prior art.

As shown in FIG. 1, the liquid crystal panel 210 includes a bottom substrate 201, a top substrate 202, and a liquid crystal layer 209 sandwiched between the bottom and the top substrates 201 and 202. A first liquid crystal domain A where the liquid crystal molecules are twisted in a first direction 1 is placed at the left side L of the pixel. A second liquid crystal domain B where the liquid crystal molecules are twisted in a second direction 2 is placed at the right side R of the pixel.

The two liquid crystal domains A and B may be formed through differentiating the pretilt angles of the liquid crystal molecules at the bottom substrate 201 or the top substrate 202.

For Instance, the liquid crystal molecules placed at a predetermined region of the bottom substrate are established to have a large pretilt angle, whereas those at the corresponding region of the top substrate to have a small pretilt angle. Furthermore, the liquid crystal molecules placed at another region of the bottom substrate are established to have a small pretilt angle, whereas those at the corresponding region of the top substrate to have a high pretilt angle. Even though the liquid crystal molecules placed close to the substrates are oriented depending upon the respective pretilt angles due to the condition of the substrate, the liquid crystal molecules within the liquid crystal layer are oriented pursuant to the higher pretilt angle, resulting in two or more liquid crystal domains.

In the drawing, the respective liquid crystal domains A and B bear different pretilt angles with respect to the bottom and the top substrates 201 and 202. For instance, the liquid crystal molecules at the first liquid crystal domain A are tilted against the bottom substrate 201 at an angle of about 6–7° while being tilted against the top substrate 202 at an angle of about 0–1°. By contrast, the liquid crystal molecules at the second liquid crystal domain B are tilted against the bottom substrate 201 at an angle of about 0–1° while being tilted against the top substrate 202 at an angle of about 6–7°. The inclined lines at the bottom and the top substrates 201 and 202 indicate the pretilt angles of the liquid crystal molecules.

The pretilt angles of the liquid crystal molecules are determined depending upon the surface roughness of alignment films (not shown). The surface roughness of the alignment film varies depending upon the rubbing conditions, the amount of light exposure, and the surface roughness of the ITO-based layer. Conventionally, the ITO-based pixel electrode of the bottom substrate 201 and the ITO-based common electrode of the top substrate 202 have various surface roughness, thereby controlling the pretilt angles of the liquid crystal molecules close to the respective substrates. When the surface roughness of the pixel electrode is high, the pretilt angle of the liquid crystal molecules is reduced, whereas when the surface roughness of the pixel electrode is low, the pretilt angle of the liquid crystal molecules increases. Therefore, the pretilt angles of the liquid crystal molecules can be controlled based on the surface roughness of the pixel electrode.

In order to form such a pixel electrode, after the deposition of the pixel electrode layer, a photoresist pattern is formed on the pixel electrode layer while exposing the portion to be surface-treated, and the exposed portion of the pixel electrode layer is wet-etched using the photoresist pattern as a mask.

However, in the above technique, a separate mask should be provided to make surface treatment in addition to form the pixel electrode layer. This complicates the processing steps and lowers production efficiency.

SUMMARY OF THE INVENTION

It is an object of the present invention to provide a method for fabricating a multi-domain liquid crystal display bearing wide viewing angle characteristics without using an additional mask.

This and other objects may be achieved by a method for fabricating a liquid crystal display where a pixel electrode with different surface roughness is formed at each pixel area using one mask.

According to one aspect of the present invention, in a method of fabricating a liquid crystal display, a pixel electrode is formed on a bottom substrate at each pixel area using a first mask such that the pixel electrode has a first region with a smooth surface, and a second region with a rough surface, the bottom substrate having a gate wire, a data wire and a thin film transistor. And, a common electrode is formed on a top substrate using a second mask such that the common electrode has a first region with a smooth surface, and a second region with a rough surface, the top substrate having color filters; and the bottom substrate having the pixel electrode. And the top substrate is assembled with the bottom substrate, and liquid crystal is injected between the bottom substrate and the top substrate.

In order to form the bottom substrate a gate wire is formed on a first insulating substrate. The gate wire includes gate line, and gate electrode. A gate insulating layer is formed on the substrate such that the gate insulating layer covers the gate wire. A semiconductor pattern and a data wire are formed on the gate insulating layer. The data wire includes data line, source electrode connected to the data line while being connected to the semiconductor patter, and drain electrode facing the source electrode while being connected to the semiconductor pattern. A protective layer is formed on the substrate such that the protective layer covers the data wire. First contact holes are formed at the protective layer such that the first contact holes expose the drain electrode.

The first mask, has a first region transmitting light with, a first light transmissivity, and a second region transmitting the light with a second light transmissivity lower than the first transmissivity. The first and the second regions of the first mask define the shape of the pixel electrode. The first region has a semitransparent pattern, and the second region has an opaque pattern. Each of the first region and the second region consists of a plurality of sub-regions, and the sub-regions of the first region and the second region are alternately arranged.

In order to form the pixel electrode, a transparent conductive layer is deposited over the bottom substrate. A photoresist film is coated on the transparent conductive layer. The photoresist film is selectively exposed to light using the mask. A photoresist pattern is formed on the conductive layer. The photoresist pattern has a first photoresist portion placed over the first region of the pixel electrode with a first thickness, and a second photoresist portion placed over the second region of the pixel electrode with a second thickness larger than the first thickness. The transparent conductive layer is etched using the photoresist pattern as a mask. The first photoresist portion is removed while exposing the underlying transparent conductive layer. The first region of the pixel electrode is formed through surface-treating the exposed portion of the transparent conductive layer. The second photoresist portion is removed while exposing the second region of the pixel electrode.

The surface may be treated through bombarding inert gas on the exposed portion of the transparent conductive layer, or through wet-etching the exposed portion of the transparent conductive layer using a wet etching solution. The first and the second portions of the photoresist pattern may be removed through dry etching.

The semiconductor pattern and the data wire are formed, through photolithography using a photoresist pattern having different thickness. The photoresist pattern has a first photoresist portion placed over the data wire with a first thickness, and a second photoresist portion, placed over the source and the drain electrode with a second thickness smaller than the first thickness.

In order to form the semiconductor pattern and the data wire, a semiconductor layer and a conductor layer are deposited on the gate insulating layer, and the photoresist pattern is formed on the conductive layer. The conductive layer is etched using the photoresist pattern as a mask while partially exposing the semiconductor layer. A semiconductor pattern is completed through removing the exposed portion of the semiconductor layer and the second portion of the photoresist pattern while partially exposing the conductive layer between the source and the drain electrode. A data wire is formed through removing the exposed portion of the conductive layer, and the first portion of the photoresist pattern is removed. The photoresist pattern may be formed using a mask having a first region with a predetermined light transmissivity, a second region with a light transmissivity lower than the light transmissivity of the first region, and a third region with a light transmissivity higher than the light transmissivity of the first region.

The step of forming the data wire may be made after the semiconductor pattern is formed on the gate insulating layer.

In order to form the top substrate, color filters are formed on a second insulating substrate A common electrode is formed on the substrate such that the common electrode covers the color filters. The common electrode may be formed in the following way. A transparent conductive layer is deposited over the second insulating substrate such that the transparent conductive layer covers the color filters. A photoresist film is coated on the transparent conductive layer. The photoresist film is selectively exposed to light using the second mask. A photoresist pattern is formed on the transparent conductive layer through developing the light-exposed photoresist film. The photoresist pattern has a first portion placed over the first region of the common electrode with a first thickness, and a second portion placed over the second region of the common electrode with a second thickness larger than the first thickness. The transparent conductive layer is etched using the photoresist pattern as a mask. The first portion of the photoresist pattern is removed while exposing the underlying transparent conductive layer. The first region of the common electrode is formed through surface-treating the exposed portion of the transparent conductive layer, and the second region of the common electrode is formed through removing the second portion of the photoresist pattern. The surface may be treated through bombarding inert gas on the exposed portion of the transparent conductive layer, or through wet-etching the exposed portion of the transparent conductive layer using a wet etching solution.

The first and the second portions of the photoresist pattern may be removed through dry etching.

The resulting liquid crystal display includes a bottom substrate with a first region where liquid crystal molecules bear a first pretilt angle, and a second region where liquid crystal molecules bear a second pretilt angle larger than the first pretilt angle. A top substrate faces the bottom substrate with liquid crystal molecules bearing a third pretilt angle. The third pretilt angle mediates between the first and the second pretilt angles. A liquid crystal layer is sandwiched between the bottom and the top substrates with liquid crystal molecules. The liquid crystal molecules of the liquid crystal layer are twisted at the first region in a first direction while being twisted at the second region in a second direction.

The bottom substrate includes a gate wire, and a data wire crossing over the gate wire while being insulated from the gate wire. Thin film transistors are electrically connected to the gate wire and the data wire, and pixel electrode are electrically connected to the thin film transistors. Each pixel electrode bears a first surface roughness at the first region while bearing a second surface roughness at the second region. The second surface roughness is higher than the first surface roughness.

The top substrate includes a common electrode corresponding to the pixel electrode with a third surface roughness medium between the first surface roughness and the second surface roughness. An alignment film on the common electrode may have grooves such that the liquid crystal molecules close thereto bear a third pretilt angle.

According to another aspect of the present invention, in a method for fabricating a liquid crystal display, a bottom substrate is formed such that it has a first region where liquid crystal molecules bear a first pretilt angle, and a second region where liquid crystal molecules bear a second pretilt angle smaller than the first pretilt angle. A top substrate is formed such that it faces the bottom substrate with liquid crystal molecules bearing a third pretilt angle the third pretilt angle medium between the first pretilt angle and the second pretilt angle. A liquid crystal layer is formed between the bottom and the top substrates with liquid crystal molecules. The liquid crystal molecules of the liquid crystal layer are twisted at the first region in a first direction while being twisted at the second region in a second direction.

In order to form the bottom substrate, a gate wire, a data wire and thin film transistor are formed on a first insulating substrate such that the data wire crosses over the gate wire while being insulated from the gate wire, and the thin film transistors are electrically connected to the data wire. Pixel electrode is formed such that they are electrically connected to the thin film transistors. Each pixel electrode bears a first surface roughness at the first region while bearing a second surface roughness at the second region. The second surface roughness is higher than the first surface roughness.

In order to form the pixel electrode, a transparent conductive layer is deposited over the top substrate. A photoresist film is coated on the transparent conductive layer. The photoresist film is selectively exposed to light using a mask. A photoresist pattern is formed on the transparent conductive layer through developing the light-exposed photoresist film. The photoresist pattern has a first portion placed over the first region of the common electrode with a first thickness, and a second portion placed over the second region of the common electrode with a second thickness larger than the first thickness. The transparent conductive layer is etched using the photoresist pattern as a mask. The first portion of the photoresist pattern is removed while exposing the underlying transparent conductive layer. The first region of the pixel electrode is formed through surface-treating the exposed portion of the transparent conductive layer. The second region of the pixel electrode is formed through removing the second portion of the photoresist pattern. The surface may be treated through bombarding inert gas on the exposed portion of the transparent conductive layer, or through wet-etching the exposed portion of the transparent conductive layer using a wet etching solution.

The top substrate may be formed through forming a common electrode on a second insulating substrate such that it faces the pixel electrode with a third surface roughness medium between the first surface roughness and the second surface roughness. The common electrode maybe formed through depositing a transparent conductive layer over the top substrate, and surface-treating the transparent conductive layer such that the transparent conductive layer bears the third surface roughness. The surface may be treated through bombarding inert gas on the exposed portion of the transparent conductive layer, or through wet-etching the exposed portion of the transparent conductive layer using a wet etching solution.

Furthermore, the top substrate may be formed in the following way. A common electrode is formed on a second insulating substrate such that the common electrode faces the pixel electrode. An alignment film is coated over the substrate such that the alignment film covers the common electrode. The alignment film is rubbed such that the liquid crystal molecules at the top substrate bear the third pretilt angle.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein:

FIGS. 5A through 17B sequentially illustrate the steps of fabricating the liquid crystal display shown in FIG. 2;

DETAILED DESCRIPTION OF THE PREFERRED EMBODIMENTS

Preferred embodiments of this invention will be explained with reference to the accompanying drawings.

Figure 1:
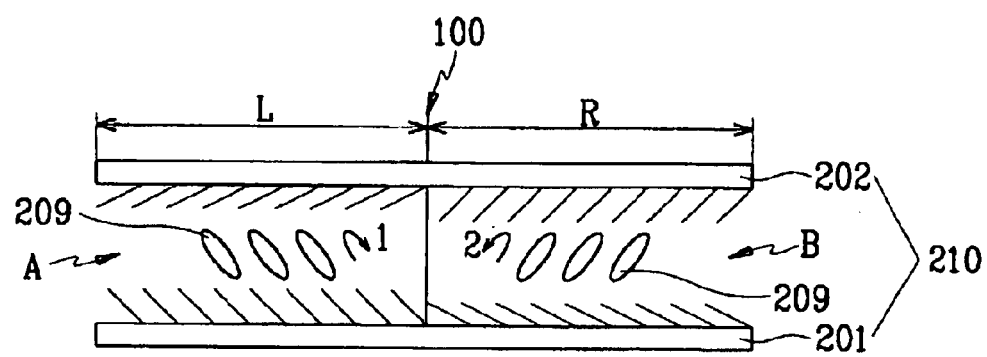
FIG. 1 is a schematic sectional view of a liquid crystal display at one pixel area according to a prior art.
Figure 2:
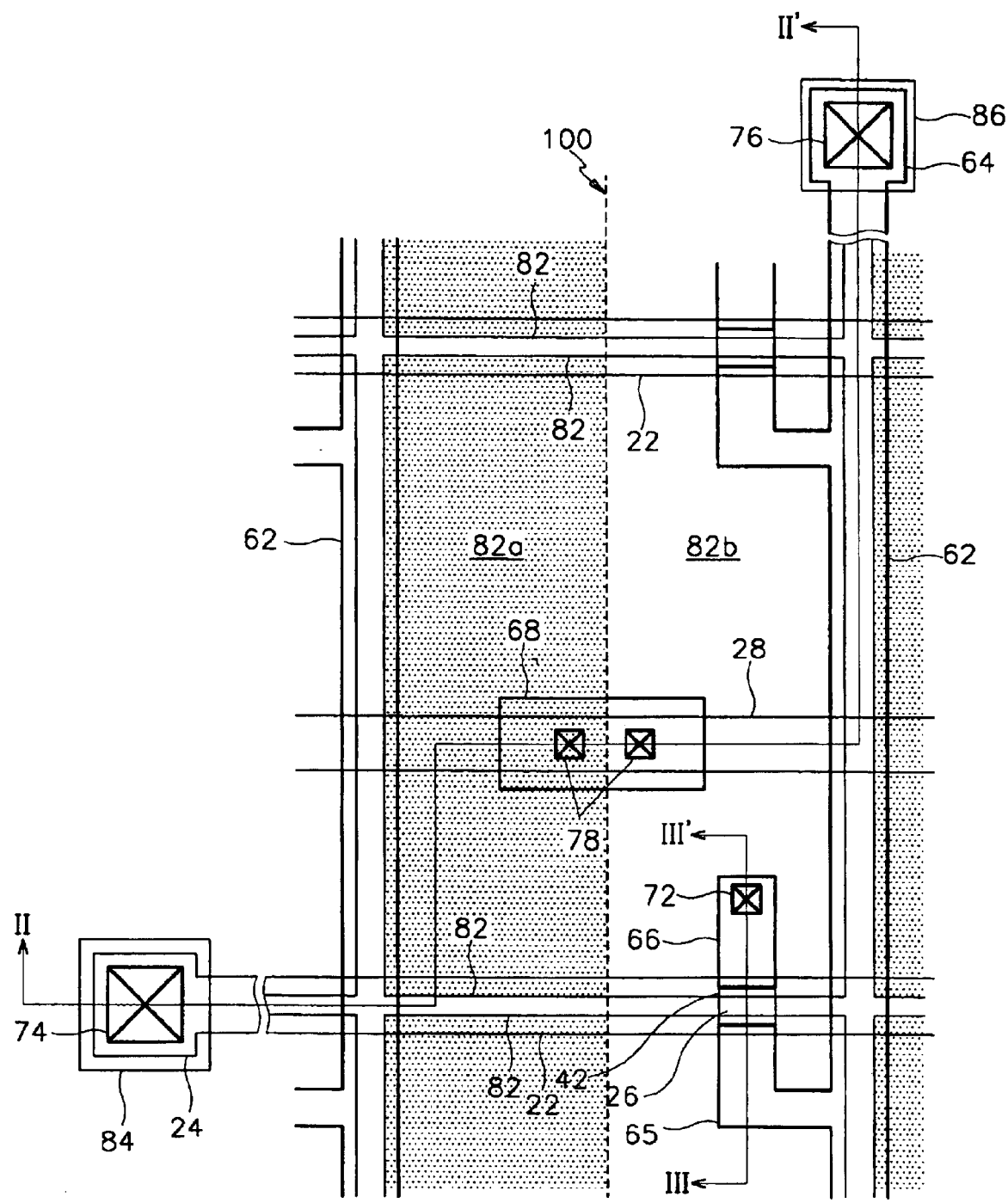
FIG. 2 is a plan view of a liquid crystal display according to a first preferred embodiment of the present invention.
Figure 3:
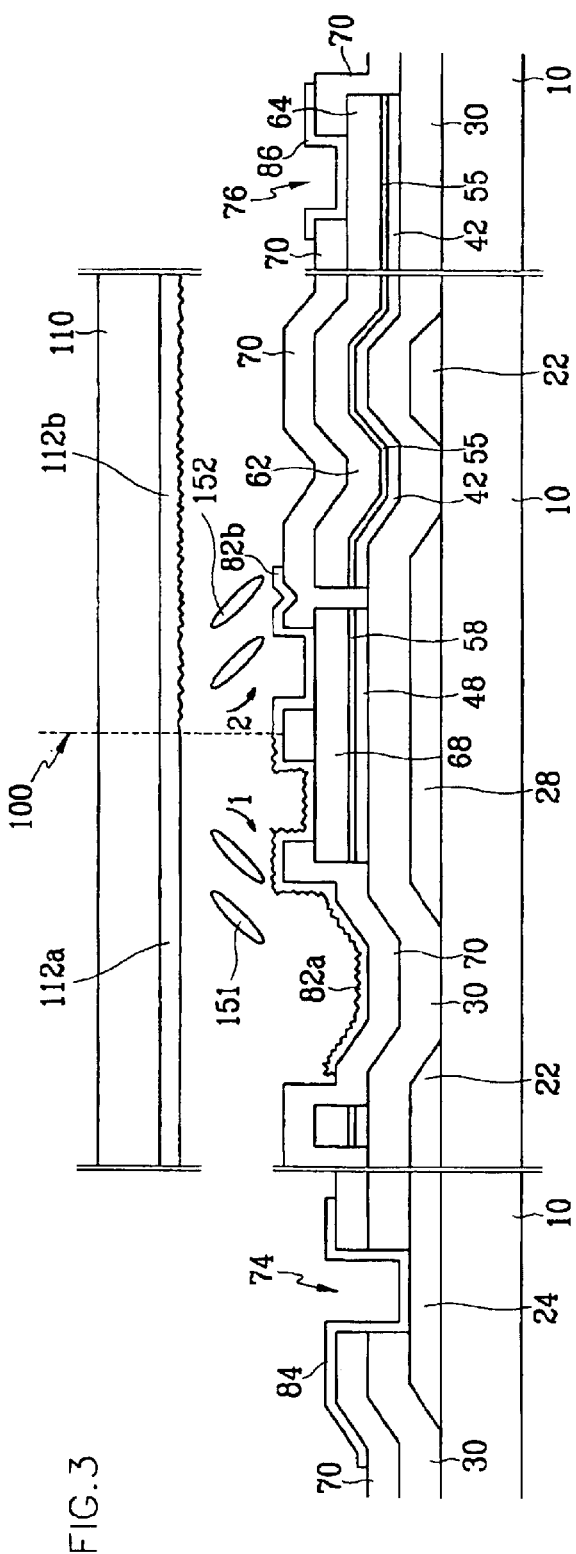
FIGS. 3 and 4 are cross sectional views of the liquid crystal display taken along the II–II' line and the III–III' line of FIG. 2, respectively.
Figure 4:
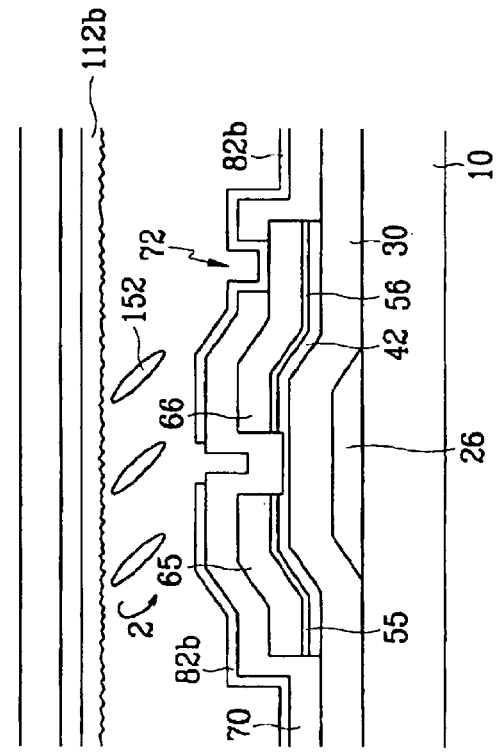

FIG. 2 is a plan view of a liquid crystal display according to preferred embodiment of the present invention, and FIGS. 3 and 4 are cross sectional views of the liquid crystal display taken along the II–II' line and the III–III' line of FIG. 2, respectively.

Gate wires are formed on an insulating substrate 10. Each gate wire includes gate line 22 proceeding in the horizontal direction, gate pad 24, gate electrode 26, and storage capacitor electrode 28. The storage capacitor electrode 28 proceeds in parallel with the gate line 22 to receive common voltages from the outside.

The storage capacitor electrode 28 is overlapped with a storage capacitor conductive pattern 68 connected to pixel electrode 82 to be described later to thereby form storage capacitor for enhancing the electric potential storage rapacity of the pixels. In case a sufficient storage capacity is obtained with the overlapping of the pixel electrode 82 and the gate line 22, the storage capacitor electrode 28 may be omitted.

The gate wire may be formed with a single-layered structure, or a multiple-layered structure. It is preferable that the gate wires are formed with a low resistance metallic material. In a single layered structure, the gate wire may be formed with a metallic material based on chrome or chrome alloy, molybdenum or molybdenum alloy, aluminum or aluminum alloy, or, silver or silver alloy. In a double-layered structure, at least one layer may be formed with a low resistance metallic material.

A gate insulating layer 30 is formed on the substrate 10 with an insulating material such as silicon nitride such that it covers the gate wire.

Semiconductor patterns 42 and 48 formed with amorphous silicon are formed on the gate insulating layer 30 and ohmic contact patters 55, 56 and 58 formed with impurities-doped amorphous silicon are formed on the semiconductor patterns 42 and 48.

A data wire is formed on the ohmic contact patterns 55, 56 and 58. Each data wire includes data line 62 proceeding in the vertical direction, data pad 64, source and drain electrodes 65 and 66 for thin film transistors and a storage capacitor conductive pattern 68 placed over the storage capacitor electrode 28.

The data wire may be formed with a single-layered structure, or a multiple-layered structure. It is preferable that the data wires are formed with a low resistance metallic material. In a single-layered structure, the data wire may be formed with a metallic material based on chrome or chrome alloy, molybdenum or molybdenum alloy, aluminum or aluminum alloy, or, silver or silver alloy. In a double-layered structure, at least one layer may be formed with a low resistance metallic material.

The semiconductor patterns 42 and 48 comprise a portion for thin film transistor 42, and a portion for storage capacitor 48. The semiconductor patterns 42 and 48 have the same shape as the data wire and the ohmic contact patterns except for the channel region between the source and the drain electrodes 65 and 66. That is, the storage capacitor semiconductor pattern 48 has the same shape as the storage capacitor conductive pattern 68 or the storage capacitor ohmic contact pattern 58. The thin film transistor semiconductor pattern 42 has the same shape as the data line 62, the data pad 64, and the source and drain electrodes 65 and 66 except that it continuously proceeds at the channel region between the source and the drain electrodes 65 and 66 without separation.

The ohmic contact pattern 56, and 58 lower the contact resistance between the underlying semiconductor patterns 42 and 48 and the overlying data wire while bearing the same shape as the data wire. The ohmic contact patterns 55, 56 and 58 is formed with a first portion 55 contacting the data line 62, the data pad 64 and the source electrode 65, a second portion 56 contacting the drain electrode 66, and a third portion 58 contacting the storage capacitor conductive pattern 68.

A protective layer 70 is formed on the resultant substrate comprising the data wire to cover the data wire. The protective layer 70 is formed with an inorganic insulating material such as silicon nitride, or an organic material such as benzocyclobutene (BCB).

The protective layer 70 is provided with first contact hole 72 exposing the drain electrode 66, second contact hole 74 exposing the gate pad 24 together with the gate insulating layer 30, and third contact hole 76 exposing the data pad 64. Furthermore, fourth contact hole 78 is formed in the protective layer 70 to expose the storage capacitor conductive pattern 68.

Pixel electrode 82 connected to the drain electrode 66 through the first contact hole 72, and subsidiary gate and data pads 84 and 86 connected to the gate and the data pads 24 and 64 through the second and the third contact holes 74 and 76 are formed on the protective layer 70. The pixel electrode 82 is also connected to the storage capacitor conductive pattern 68 through the fourth contact hole 78 to transmit picture signals to the storage capacitor conductive pattern 68.

The pixel electrode 82 is formed with a transparent conductive material such as indium tin oxide (ITO) and indium zinc oxide (IZO).

One side of the pixel electrode 82 with respect to the center line 100 is patterned to have a rough surface. The portion of the pixel electrode 82 with a rough surface will be hereinafter referred to as the first pixel electrode region 82a, and the other portion of the pixel electrode 82 with a smooth surface as the second pixel electrode region 82b.

As mentioned, the surface roughness of the pixel electrode 82 is related to the pretilt angles of the liquid crystal molecules. The pretilt angle of the liquid crystal molecules at the first pixel electrode region 82a is small, whereas the pretilt angle thereof at the second pixel electrode region 82b is large.

As shown In FIG. 3, a common electrode 112 is formed at the top substrate 110 and corresponds to the pixel electrode 82. The one portion of the common electrode 112 has a smooth surface, being referred to as the first common electrode region 112a and the other portion of the common electrode 112 also has a rough surface, being referred to as the second common electrode region 112b. The first common electrode region 112a corresponds to the first pixel electrode region 82a, and the second common electrode region 112b corresponds to the second pixel electrode region 82b. The pretilt angle of the liquid crystal molecules at the first common electrode region 112a is large, and the pretilt angle thereof at the second common electrode region 112b is small.

The liquid crystal molecules 151 interposed between the first pixel electrode region 82a bearing a small pretilt angle and the first common electrode region 112a bearing a large pretilt angle are twisted in the first direction 1 pursuant to the pretilt angle of the first common electrode region 112a to thereby form a first liquid crystal domain. By contrast, the liquid crystal molecules 152 interposed between the second pixel electrode region 82b bearing a large pretilt angle and the second common electrode region 112b bearing a small pretilt angle are twisted in the second direction 2 pursuant to the pretilt angle of the second pixel electrode region 82b to thereby form a second liquid crystal domain. That is, two liquid crystal domains that are twisted in different directions are present at one pixel area.

In one pixel region the liquid crystal molecules at a predetermined region of the bottom substrate bear a large pretilt angle, and those at the corresponding region of the top substrate bear a small pretilt angle, whereas the liquid crystal molecules at another region of the bottom substrate bear a small pretilt angle, and those at the corresponding region of the top substrate bear a large pretilt angle. In this way, a multi domain structure is formed in one pixel region pursuant to the different pretilt angles of the liquid crystal molecules at the top and the bottom substrates, serving to improve wide viewing angle characteristic of the resulting display device.

A method for fabricating a bottom substrate for the liquid crystal display will be now explained with reference, to FIGS. 5A, 5B, 5C, 6A, 6B, 6C, 7A, 7B, 8A, 8B, 9A, 9B, 10A, 10B, 11A, 11B, 11C, 12A, 12B,12C, 13A, 13B, 14, 15A, 15B, 16A, 16B, 17A AND 17B and FIGS. 2, 3 and 4.

Figure 5A:
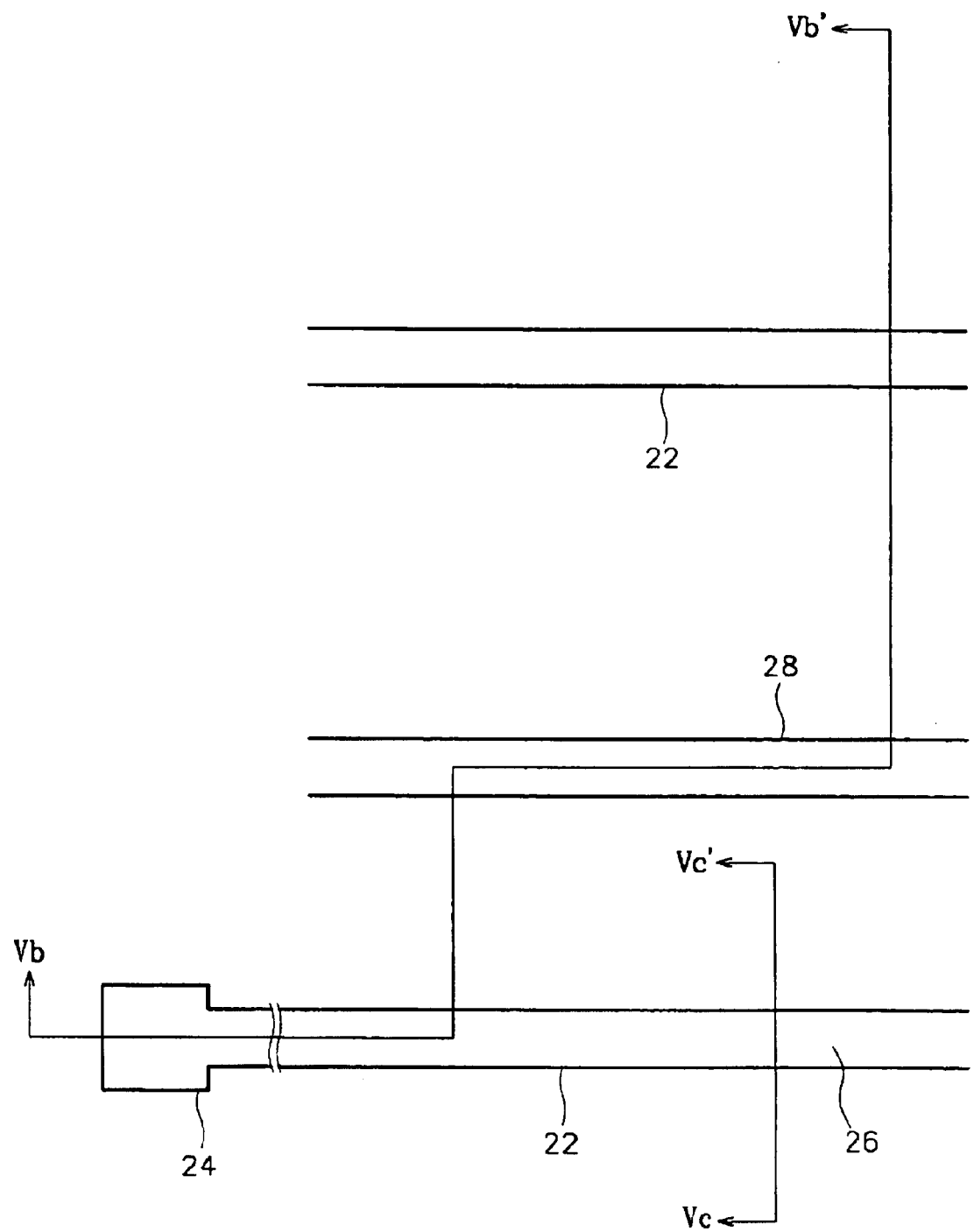

As shown in: FIGS. 5A though 5C, a gate wire is formed on an insulating substrate 10 through depositing a low resistance metallic layer on the insulating substrate 10 and patterning the deposited layer through photolithography The gate wire includes gate line 22, gate pad 24, gate electrode 26, and storage capacitor electrode 28.

Alternatively, two or more metallic layers may be deposited on the substrate and patterned to thereby form a gate wire with a multiple-layered structure.

Figure 6A:
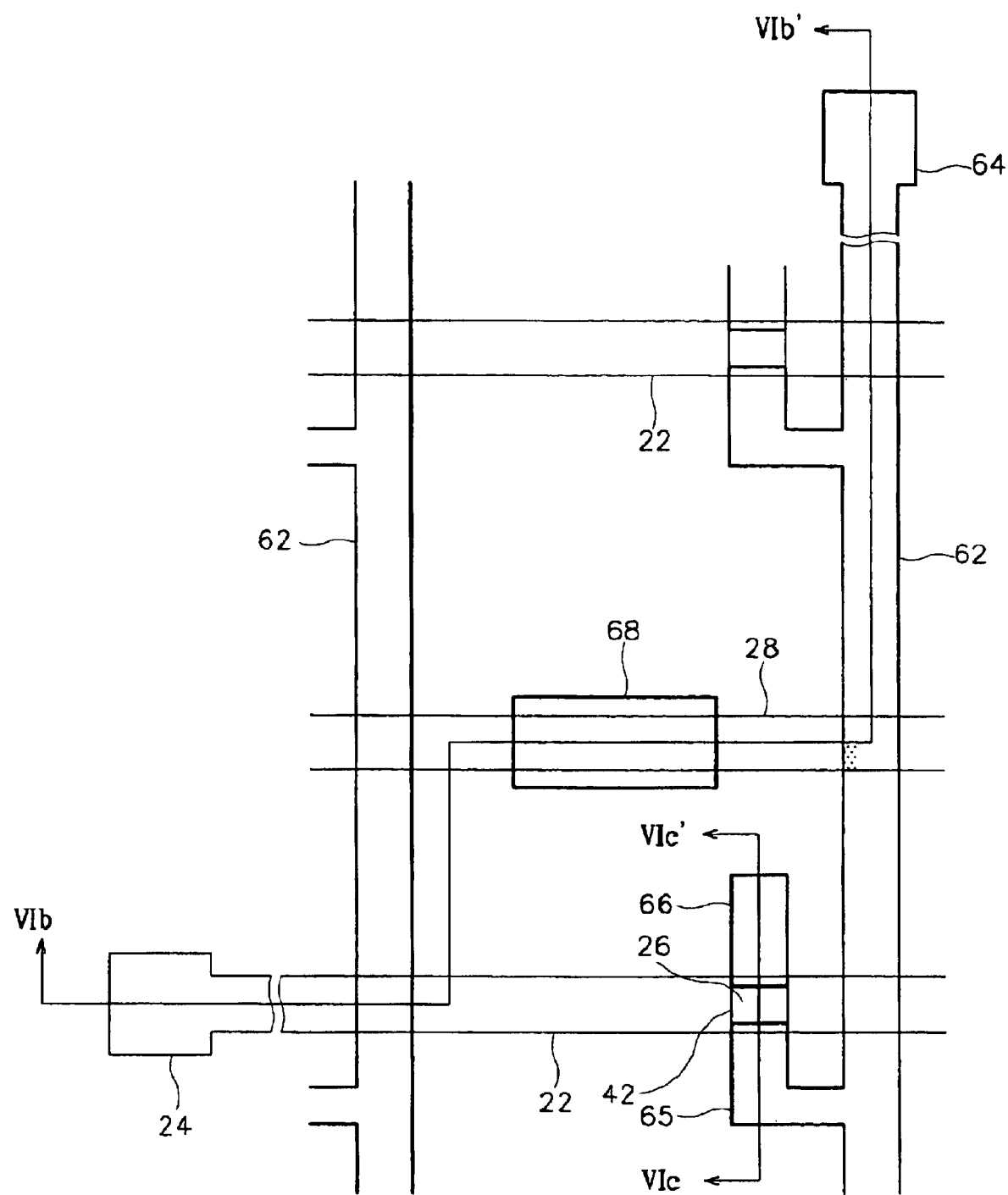
Figure 6B:
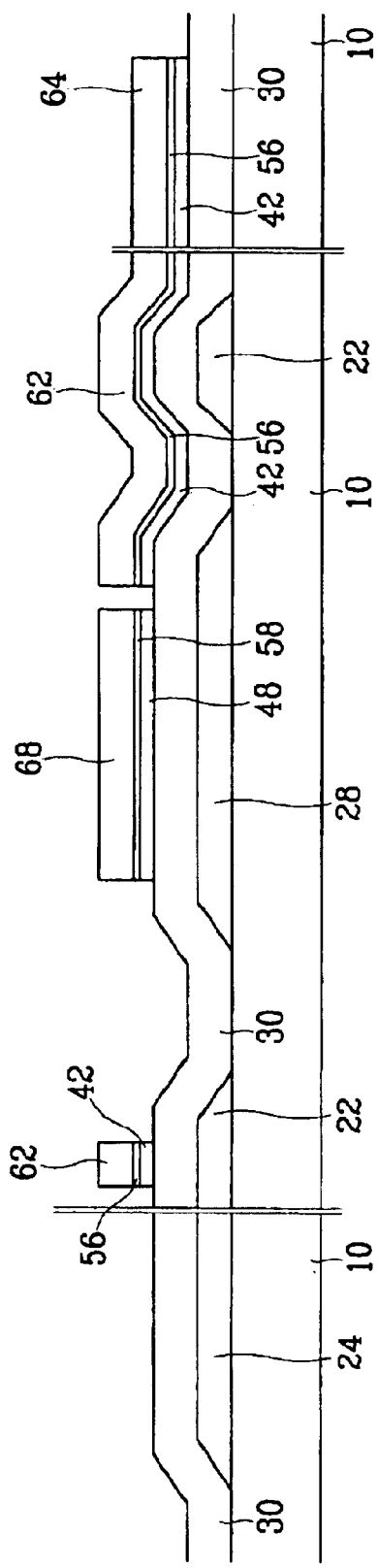
Figure 6C:
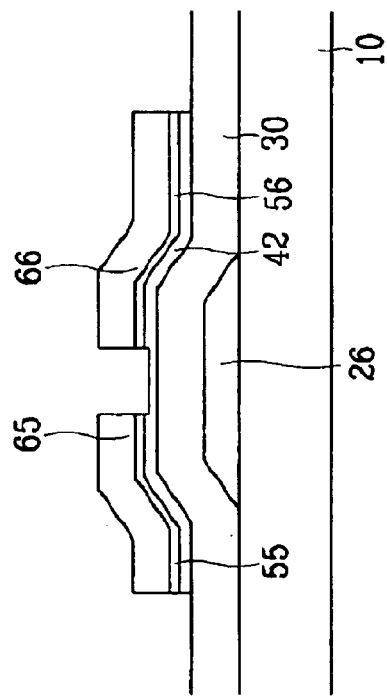

Thereafter, as shown in FIGS. 6A through 6C, a gate insulating layer 30 is formed on the gate wire, and semiconductor patterns 42 and 48, ohmic contact patterns 55, 56 and 58 and a data wire are formed on the gate insulating layer 30.

The data wire Includes data line 62, data pad 64 source electrode 65, drain electrode 66, and a storage capacitor conductive pattern 68.

The ohmic contact patterns 55, 56 and 58 placed under the data wire has the same shape as the data wire, and the semiconductor patterns 42 and 48 placed under the ohmic contact patterns 55, 56 and 58 have a portion for third film transistors 42, and a portion for storage capacitors 48. The thin film transistor semiconductor pattern 42 has the same shape as the data line 62, the data pad 64, and the source and drain electrodes 65 and 66 except that it continuously proceed at channel region between the source and the drain electrode 65 and 66 without separation.

The data wire, the ohmic contact patterns 55, 56 and 58, and the semiconductor patterns 42 and 48 may be formed using one mask. This technique will be now explained with reference to FIGS. 7A through 10B.

Figure 7A:
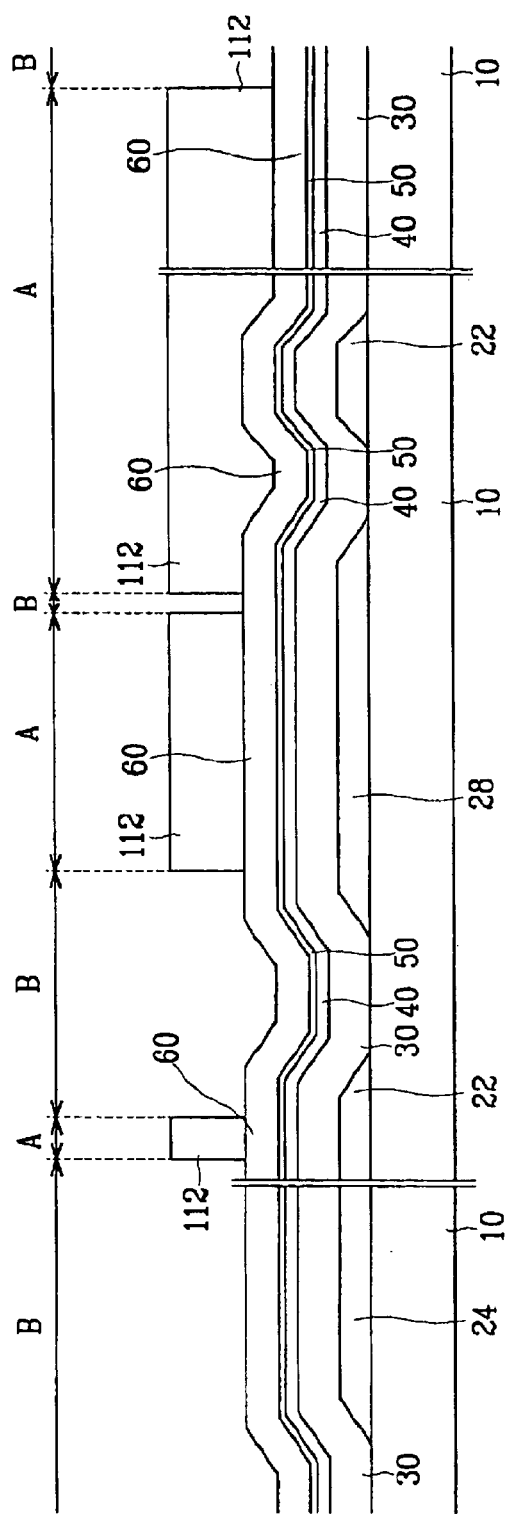
Figure 7B:
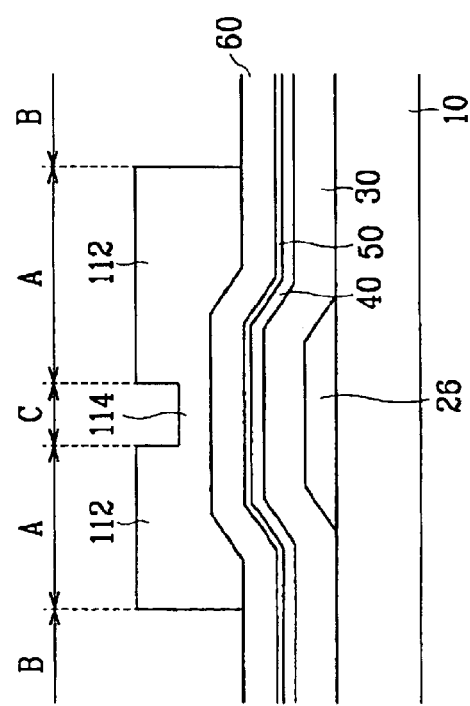

As shown in FIGS. 7A and 7B, a gate insulating layer 30, a semiconductor layer 40, and an impurity-doped semiconductor layer 50 are sequentially deposited on the resultant substrate comprising the gate wire through chemical vapor deposition. Subsequently, a low resistance metallic layer 60 is deposited on the doped semiconductor layer 50, and a photoresist film is coated on the metallic layer 60.

The photoresist film is then exposed to light, and developed to thereby form a photoresist pattern 112 and 114. The photoresist pattern has a first portion 112 placed over the data wire area A with a predetermined thickness, and a second portion 114 placed over the channel area C between the source and the drain electrode 65 and 66 with a thickness smaller than the thickness of the first portion 112. The photoresist film over the remaining area B is all removed. The thickness ratio of the second photoresist portion 114 to the first portion 112 may be controlled depending upon subsequent processing conditions. It is preferable that the thickness of the second photoresist portion 114 may be half or less of the thickness of the first photoresist portion 112.

Such a photoresist pattern having portions of different thickness may be formed with a mask having portions with different light transmission. Slit pattern, lattice pattern or a semitransparent film is usually formed in the mask to control the light transmission. In the case of using slit pattern or lattice pattern, the distance between one pattern and other pattern is established to be smaller than the resolution of a light exposing device. In the case of using a semitransparent film, thin film having portions of different thickness or light transmissivity may be used to control the light transmission.

When the photoresist film is exposed to light through such a mask, the molecules of the photoresist film at the B area directly exposed to light are completely decomposed, the molecules of the photoresist film at the C area corresponding to the slit pattern or the semitransparent film are decomposed at some degree and the molecules at the A area covered by the light interception film of the mask are barely decomposed. At this time, if the light exposing period of time is too long, all of the molecules of the photoresist film may be decomposed. Therefore, the light exposing time should be controlled in an appropriate manner.

When the selectively light-exposed photoresist film is developed, the resulting photoresist pattern has different thickness depending upon the molecular decomposition degrees.

Figure 8A:
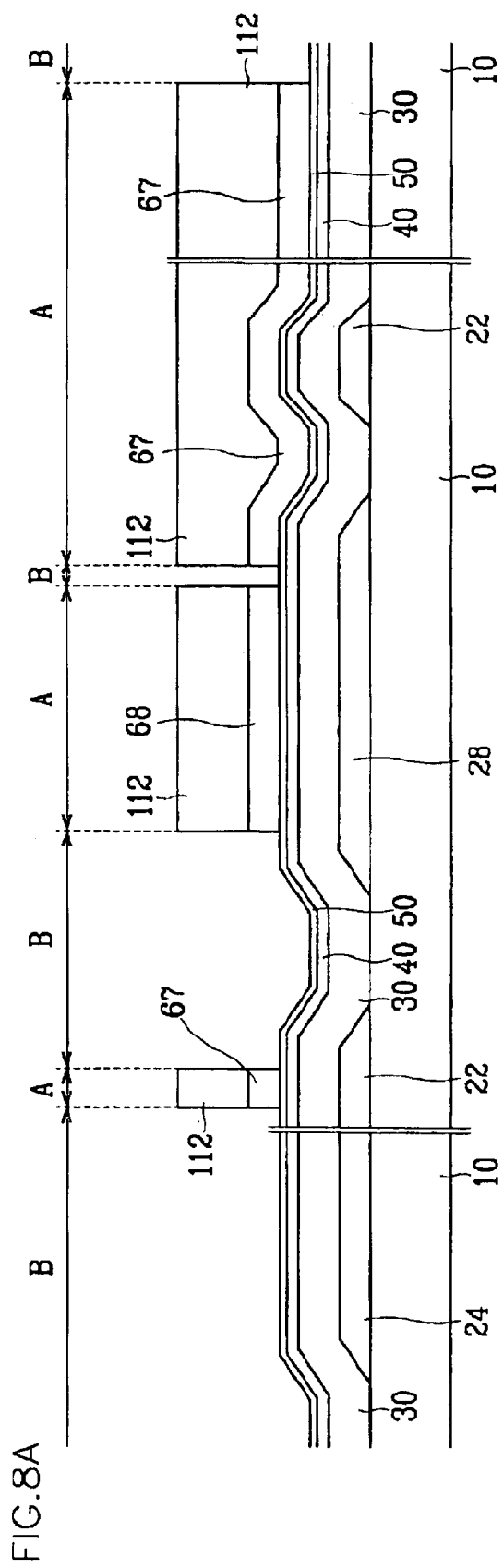
Figure 8B:
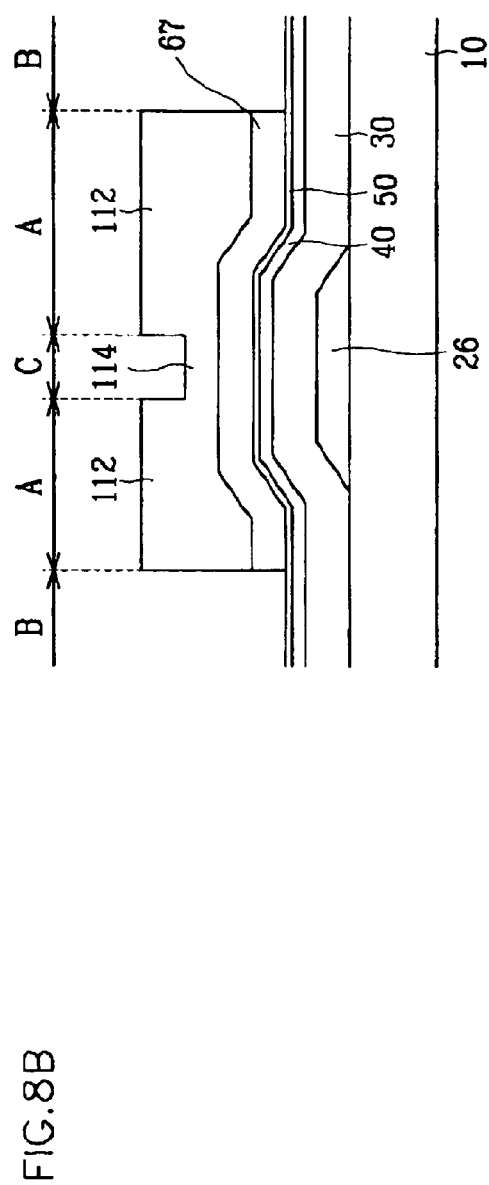

Thereafter, as shown in FIGS. 8A and 8B, using the photoresist pattern 112 and 114 as a mask, the metallic layer 60 exposed at the B area is removed. Consequently, the conductive pattern 67 and 68 at the channel area C and the data wire area A is left over, and the conductive layer at the remaining area B is removed while exposing the underlying doped semiconductor layer 50.

The conductive patterns have a portion for storage capacitor 68, and a portion for the data wire 67 where the source and the drain electrode 65 and 66 are not yet separated.

Figure 9A:
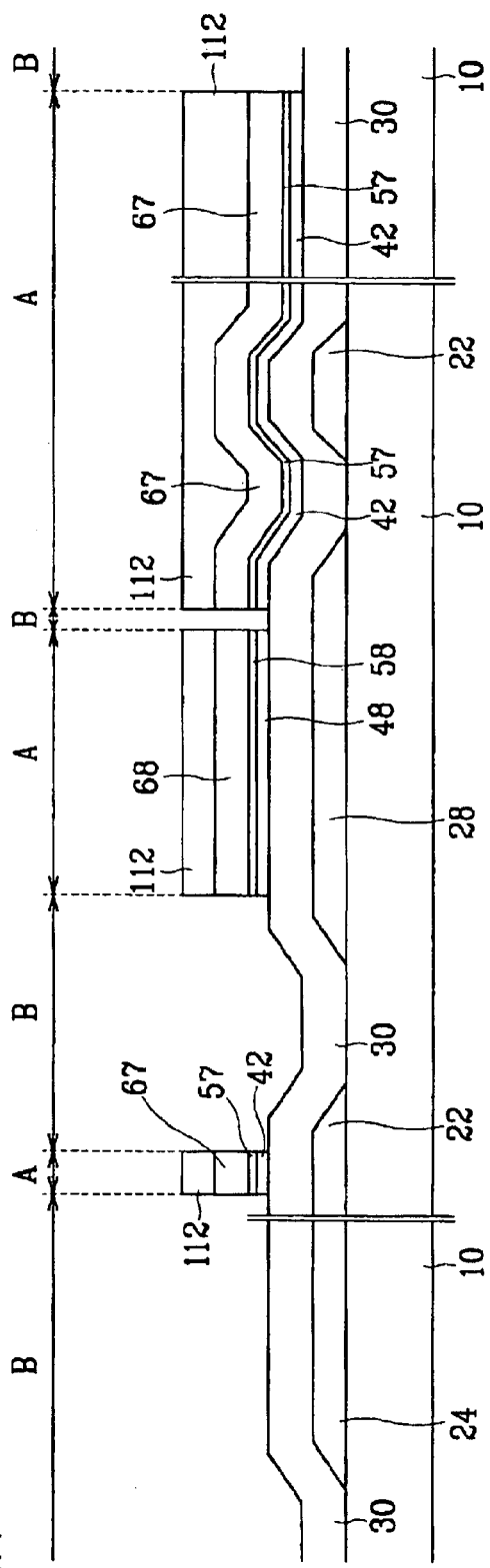
Figure 9B:
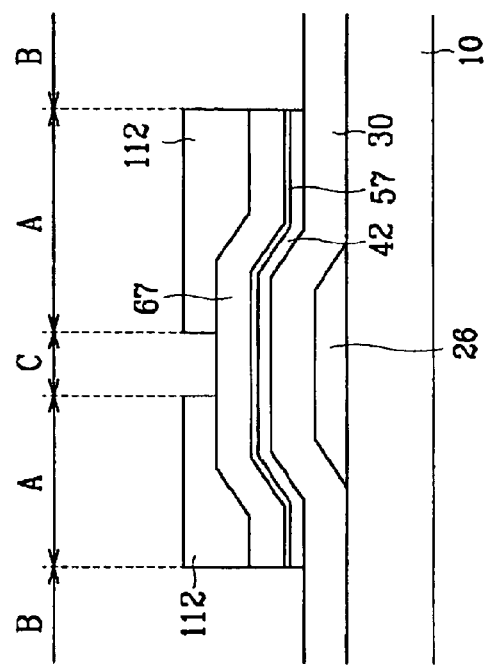

As shown in FIGS. 9A and 9B, the doped semiconductor layer 50 exposed at the B area, and the underlying semiconductor layer 40 are simultaneously removed together with the second photoresist portion 114 through dry etching. The etching should be made in condition that the photoresist pattern 112 and 114, the doped semiconductor layer 50 and the semiconductor layer 40 are simultaneously etched while not etching the gate insulating layer 30. Particularly, it is preferable that the etching ratios with respect to the photoresist pattern 112 and 114 and the semiconductor layer 40 are the same. For instance, when a mixture of $SF_6$ and HCl, or $SF_6$ and $O_2$ is used for the etching gas, the photoresist pattern 112 and 114 and the semiconductor layer 40 can be etched by nearly the same thickness.

When the etching ratios with respect to the photoresist pattern 112 and 114 and the semiconductor layer 40 are the same, the thickness of the second photoresist portion 114 should be the same as or less than the sum in thickness of the semiconductor layer 40 and the doped semiconductor layer 50.

Consequently, the second photoresist portion 114 at the channel area C is removed while exposing the conductive pattern 67, and the doped semiconductor layer 50 and the semiconductor layer 40 at area B are removed while exposing the underlying gate insulating layer 30. Meanwhile, the first photoresist portion 112 at the data wire area A is also etched while being reduced in thickness.

In this step, the semiconductor pattern with a portion for thin film transistor 42, and a portion for storage capacitor 48 is completed.

At this time, the ohmic contact pattern 57 for the thin film transistors has the same shape as the underlying thin film transistor semiconductor pattern 42, and the ohmic contact pattern 58 for storage capacitors has the same shape as the underlying storage capacitor semiconductor pattern 48.

Thereafter, the second photoresist portion 114 on the conductive pattern 67 at the channel area C is removed through ashing.

Figure 10A:
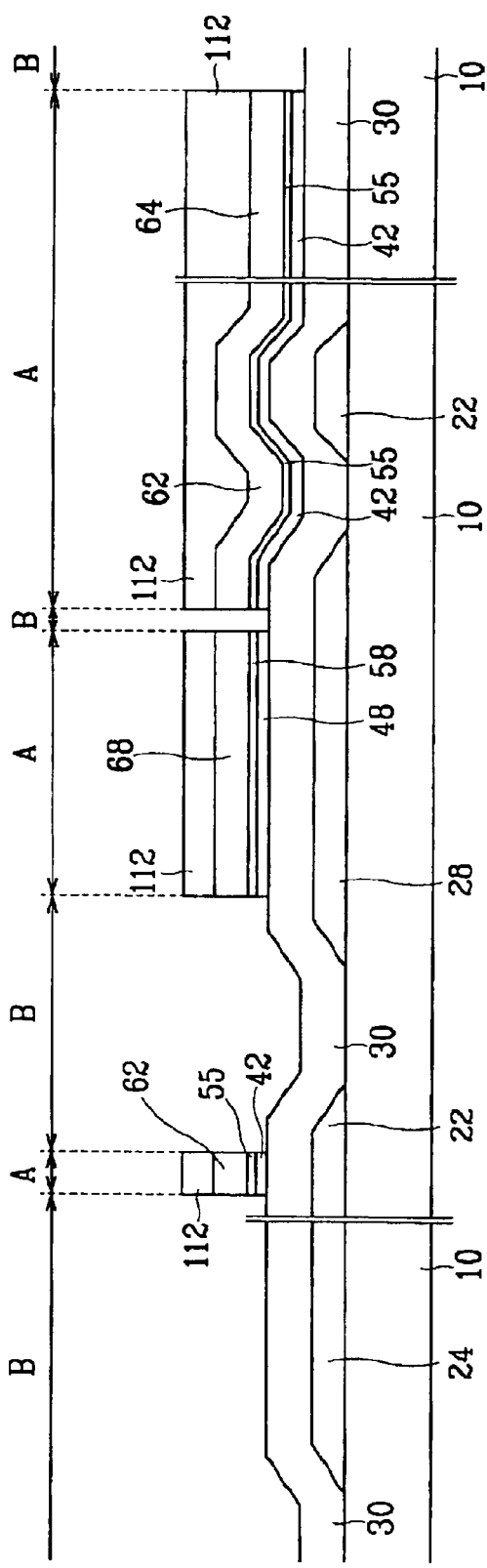
Figure 10B:
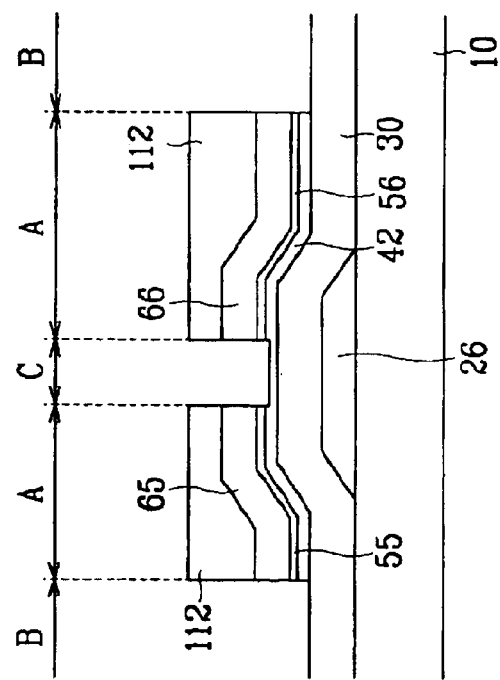

As shown in FIGS. 10A and 10B, the conductive pattern 67 and the underlying ohmic contact pattern 57 at the channel area C are etched using the remaining first photoresist portion 112 as a mask.

At this time, the semiconductor pattern 42 as well as the first photoresist portion 112 may be partially etched while being reduced in thickness. The etching should be made in condition that the gate insulating layer 30 is not etched. It is preferable that the photoresist pattern should be so thick as not to expose the underlying data wire through the etching.

As a result, source electrode 65 and drain electrode 66 are completed from the conductive pattern 67 together with data line 62, and the underlying ohmic contact patterns 55, 56 and 58 are completed.

Finally, the first photoresist portion 112 left at the data wire area A is removed through ashing, thereby resulting in the sectional structure shown in FIGS. 6B and 6C.

Figure 11A:
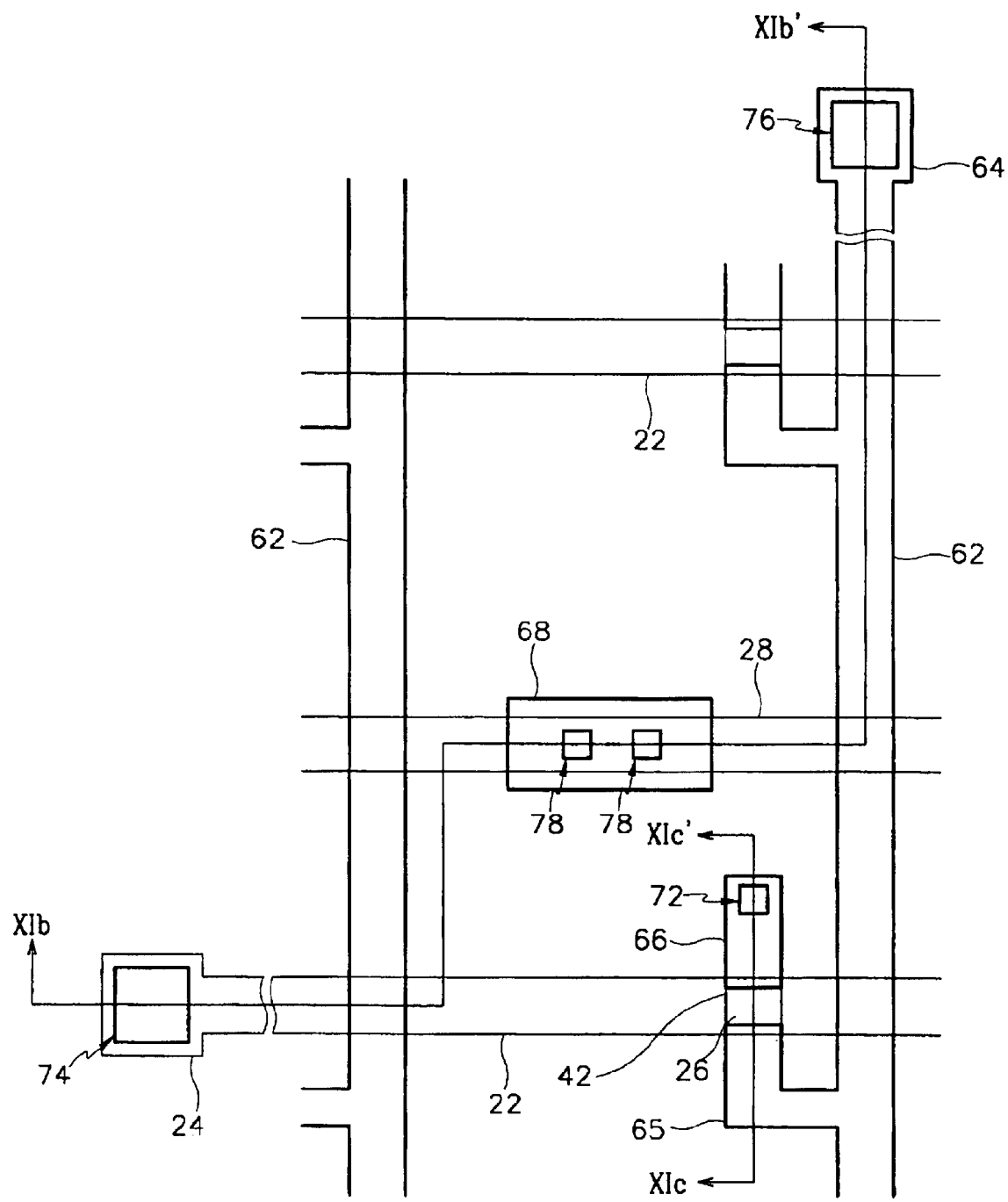

As shown in FIGS. 11A, 11B and 11C, a protective layer 70 is formed on the resultant substrate comprising the data wire through depositing a silicon nitride layer or coating an organic insulating layer.

The protective layer 70 and the gate insulating layer 30 are etched through photolithography to thereby form first, second and third contact hole 72, 76 and 78 exposing the drain electrode 66, the data pad 64 and the storage capacitor conductive pattern 68, respectively and fourth contact hole 74 exposing the gate pad 24.

Figure 12A:
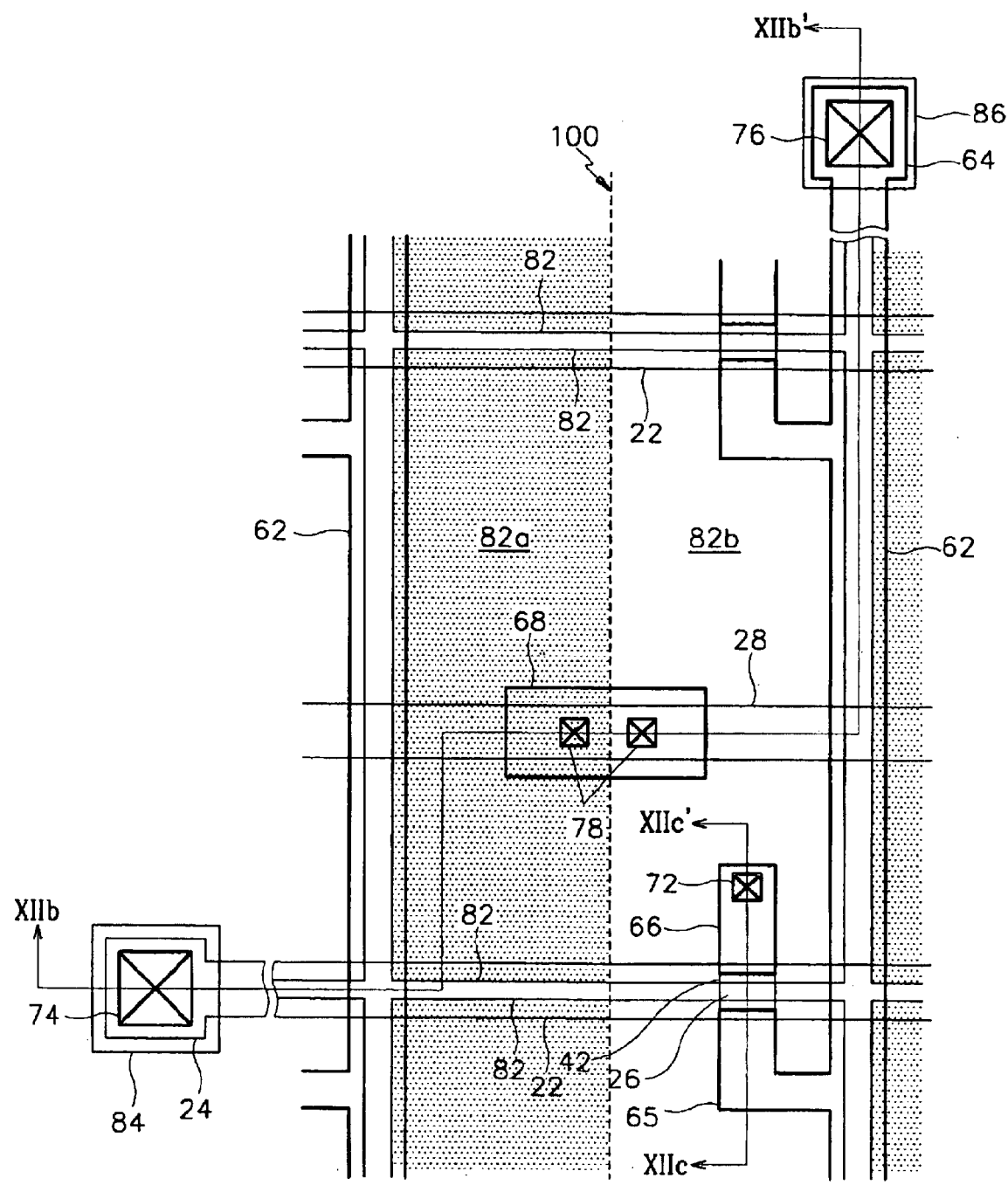
Figure 12B:
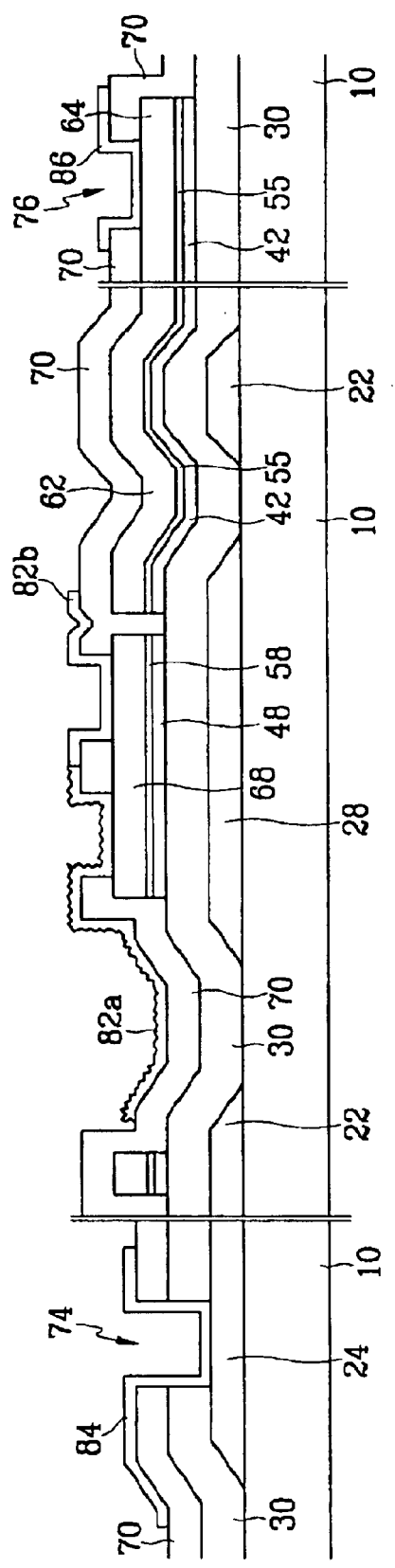
Figure 12C:
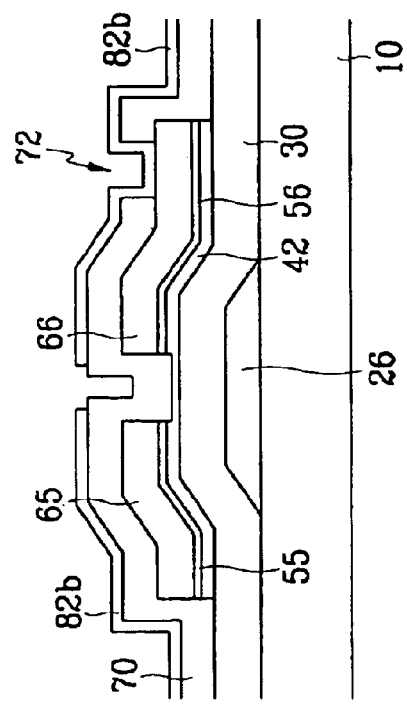

Then, as shown in FIGS. 12A, 12B and 12C; a transparent conductive layer based on ITO or IZO is deposited on the resultant substrate comprising the protective layer 70 and patterned through photolithography to thereby form pixel electrode 82 connected to the drain electrode 66 and the storage capacitor conductive pattern 68, and subsidiary gate and data pads 84 and 86 connected to the gate and the data pad 24 and 64.

At this time, the pixel electrode 82 has different surface roughness. For instance, the pixel electrode 82 is patterned such that it is divided into two regions with respect to the center line 100. That is, the pixel electrode 82 may be divided into a first pixel electrode region 82a with a rough surface, and a second pixel electrode region 82b with a smooth surface.

Such a pixel electrode may be formed using one mask. This technique will be now explained with reference to FIGS. 13A through 17B.

Figure 13A:
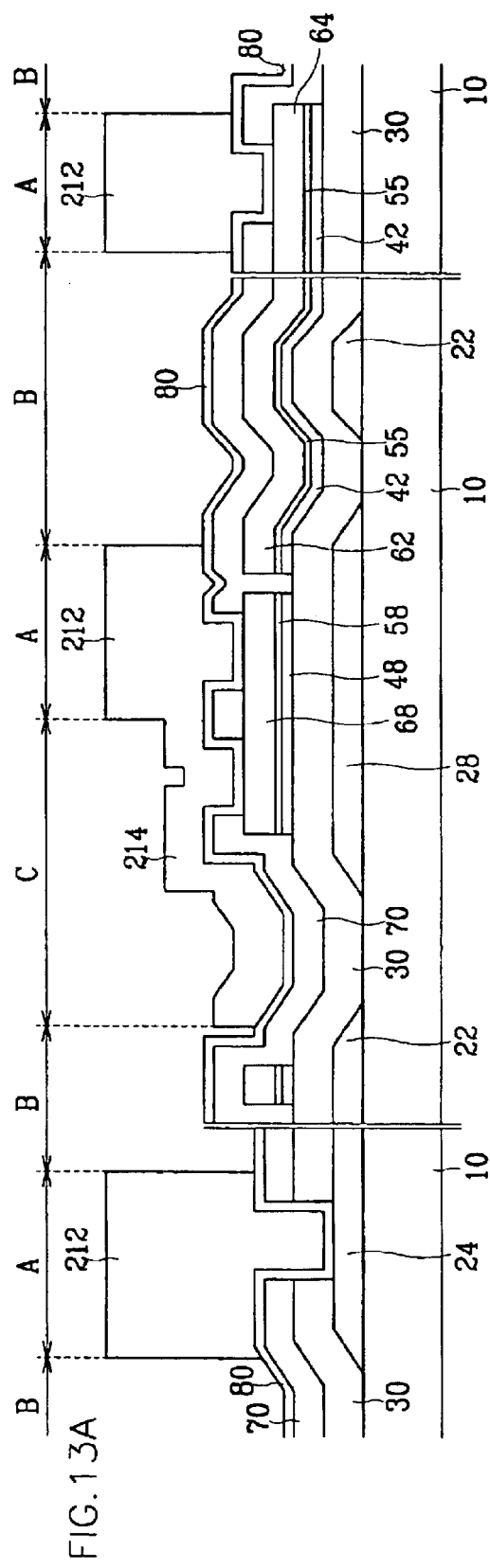
Figure 13B:
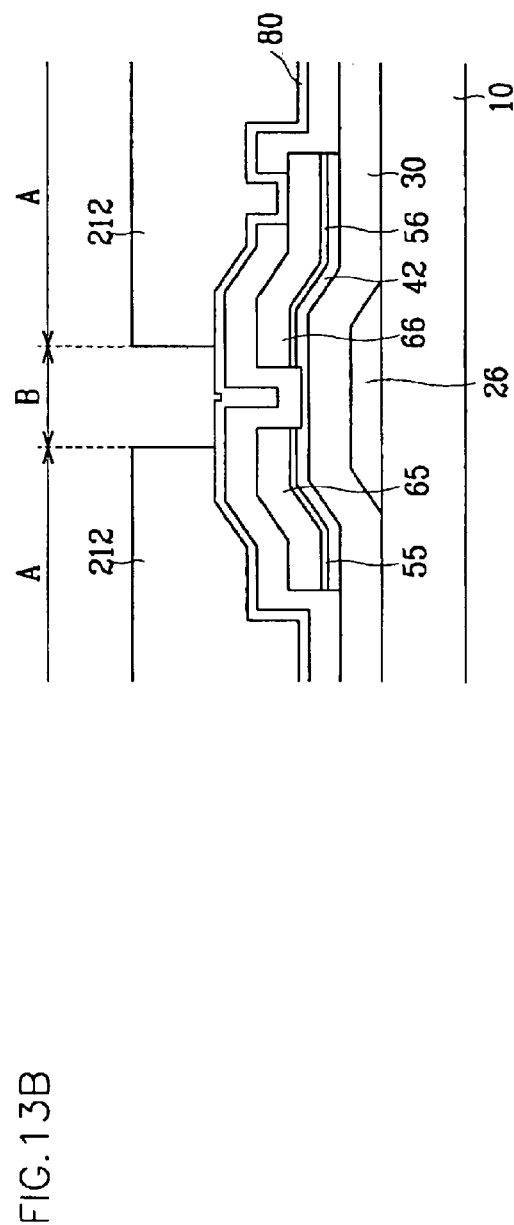

As shown in FIGS. 13A and 13B, a transparent conductive layer 80 based on ITO or IZO is deposited on the resultant substrate comprising the protective layer 70, and a photoresist film is coated on the transparent conductive layer 80.

The photoresist film is exposed to light through a mask, and developed to thereby form a photoresist pattern 212 and 214. The photoresist pattern has a first photoresist portion 212 placed over the gate pad 84, the data paid 86 and the second pixel electrode region 82b having a smooth surface, and a second photoresist portion 214 placed over the first pixel electrode region 82a having a rough surface. The photoresist film at the remaining area B is all removed.

Such a photoresist pattern having portions of different thickness may be formed with a mask having portions with different light transmission. Slit pattern, lattice pattern or a semitransparent film Is usually formed in the mask to control the light transmission. In the slit pattern or lattice pattern, the distance between one pattern and other pattern is established to be smaller than the resolution of a light exposing device. In a semitransparent film, thin film having portions of different thickness or light transmissivity may be used to control the light transmission. Such a mask can be fabricated in the way previously described with reference to FIGS. 7A and 7B.

Figure 14:
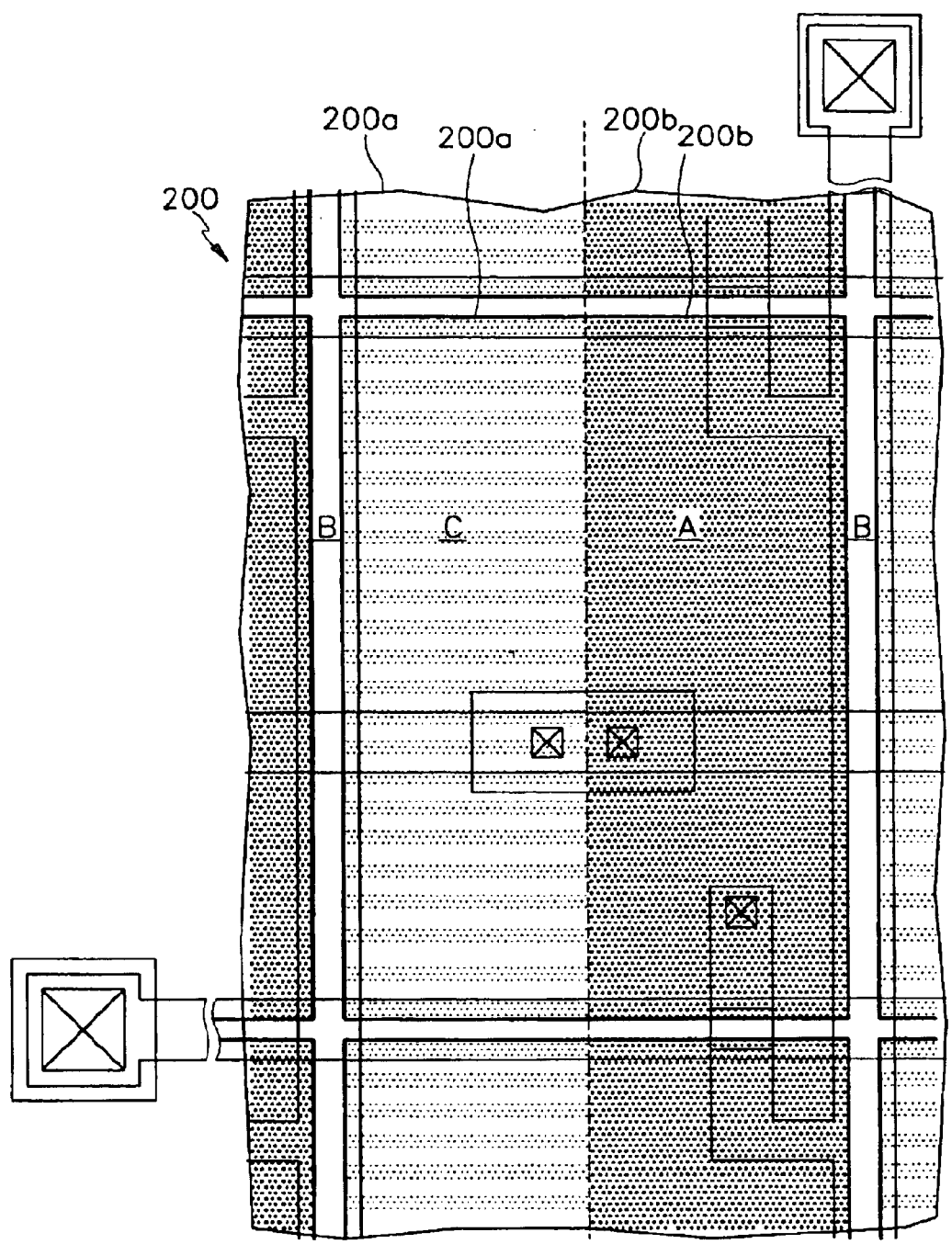

FIG. 14 illustrates a mask 200 used in forming the pixel electrode 82 where the data wires of the bottom substrate overlapped with the mask 200 are indicated by faint-lined patterns.

The mask 200 has a slit or lattice pattern 200a to be placed at the first pixel electrode region 82a to reduce the amount of light illuminated thereto, an opaque pattern 200b to be placed at the second pixel electrode region 82b to block the light, and a transparent pattern to be placed at the non-pixel electrode area to entirely expose the area to light.

As described earlier, the amount of light transmission can be controlled through varying the opening width or distance at the slit or lattice pattern. When the photoresist film is exposed to light through such a mask, the molecules of the photoresist film at the B area directly exposed to light are completely decomposed, the molecules of the photoresist film at the C area corresponding to the slit pattern or the semitransparent film are decomposed to some degree, and the molecules of the photoresist film at the A area blocked by the light interception film are barely decomposed.

When the selectively exposed photoresist film is developed, the resulting photoresist film has portions of different thickness depending upon the molecular decomposition degrees.

Figure 15A:
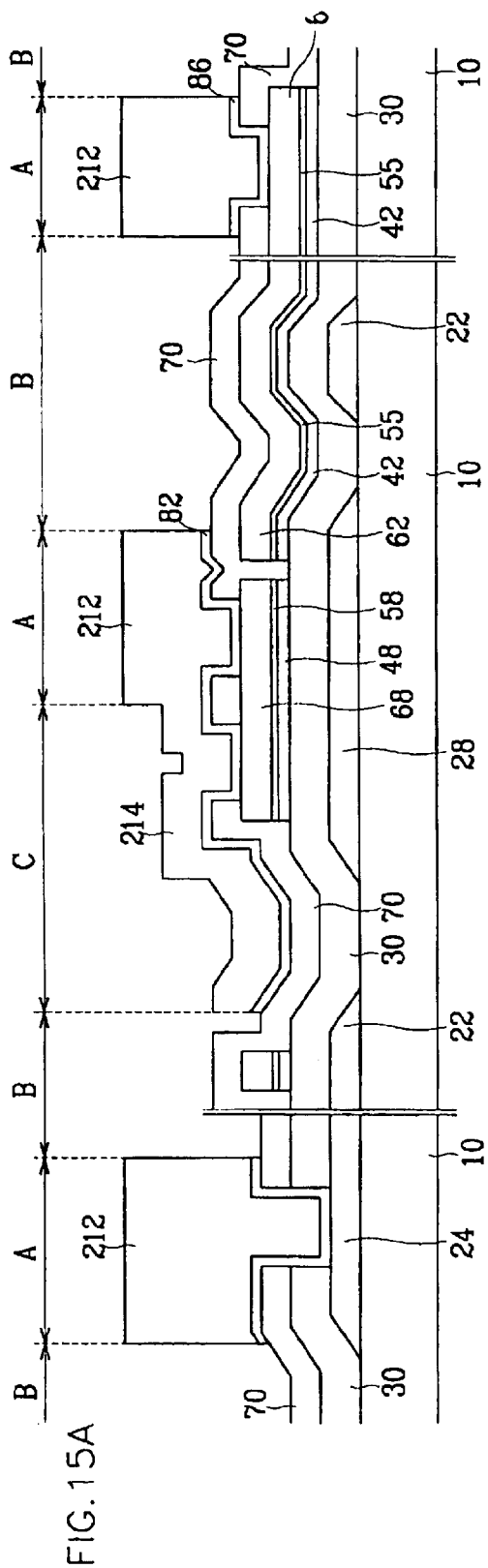
Figure 15B:
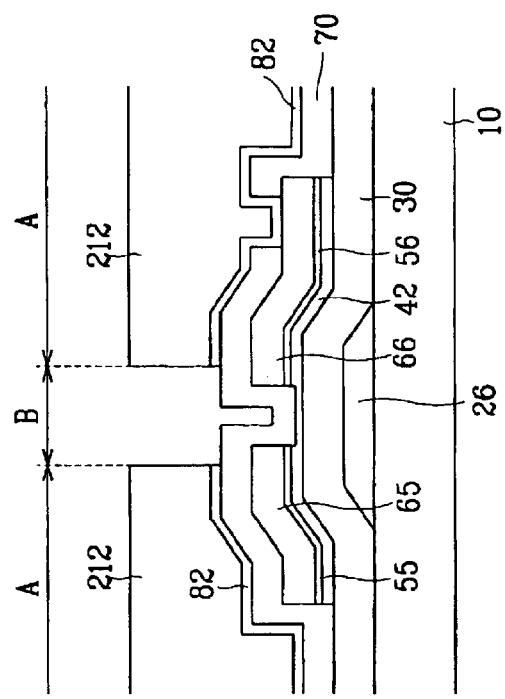

As shown in FIGS. 15A and 15B, the transparent conductive film 80 is etched using the photoresist pattern 212 and 214 as a mask to thereby form pixel electrode 82, subsidiary gate pad 84 connected to the gate pad 24, and subsidiary data pad 86 connected to the data pad 64. The portion of the transparent conductive film 80 entirely exposed to light is removed.

Thereafter, as shown in FIGS. 16A and 16B, the photoresist pattern 212 and 214 is dry-etched such that the second photoresist portion 214 is removed. At this time, $O_2$ may be used for the etching gas. In this process, the second photoresist portion 214 is removed, and the first photoresist portion 212 also reduces its thickness as much as the thickness of the second photoresist portion 214.

When the second photoresist portion 214 is removed, the portion of the pixel electrode 82 to be the first pixel electrode en 82a is exposed the outside.

Figure 17A:
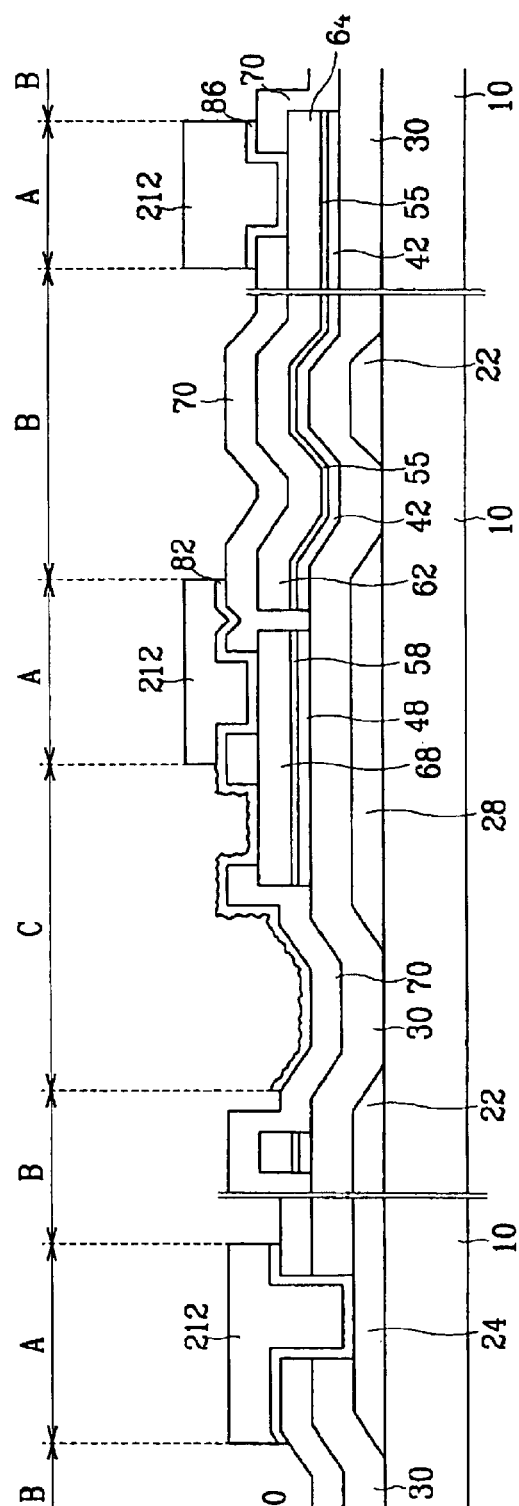
Figure 17B:
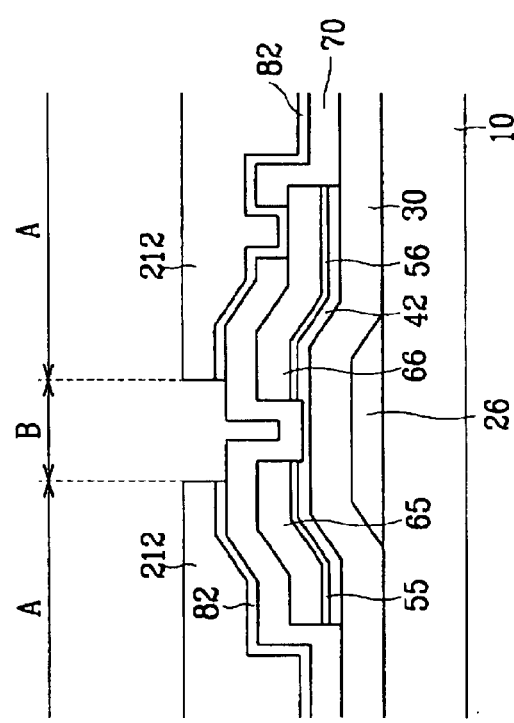

As shown in FIGS. 17A and 17B, the exposed portion of the pixel electrode 82 is surface-treated to make the surface rough. In order to roughen the surface, the following technique may be used.

First, inert gas such as argon, neon and crypton may be physically bombarded on the surface of the first pixel electrode region 82a to partially remove the surface of the pixel electrode 82. In this case, the period of time of using the inert gas or the energy of injecting the inert gas should be appropriately controlled to obtain the desired roughness of the surface.

Second, the resultant substrate shown in FIGS. 16A and 16B may be dipped into an etching solution for a predetermined period of time to etch the transparent conductive layer in chemical reaction with the transparent conductive layer and the etching solution. In this case, it is preferable that the concentration of the etching solution, or the time period for the dipping should be appropriately controlled to obtain the desired roughness of the surface.

Then, the remaining first photoresist portion 212 is removed to expose the underlying second pixel electrode region 82b with a smooth surface. Consequently, as shown in FIGS. 12B and 12C, the pixel electrode 82 having the first pixel electrode region 82a with a rough surface and the second pixel electrode region 82b with a smooth surface is completed.

In this way, the pixel electrode 82 with different surface roughness can be formed using one mask.

A top substrate corresponding to the above-structured bottom substrate can be formed in the following way.

Color filters (not shown) are formed on an insulating substrate 11O, and a common electrode 112 based on ITO or IZO covers the color filters. As with the pixel electrode 82, the common electrode 112 is also patterned such that the surface thereof becomes to be partially rough. The surface roughness of the common electrode 112 symmetrically corresponds to that of the pixel electrode 82. That is, the common electrode 112 has a first common electrode region 112a with a smooth surface that corresponds to the first pixel electrode region 82a with a rough surface, and a second common electrode region 112b with a rough surface that corresponds to the second pixel electrode region 82b with a smooth surface. Therefore, the first common electrode region 112a bears a large pretilt angle, whereas the second common electrode region 112b bears a small pretilt angle.

Such a common electrode 112 can be also formed using one mask in the same way as forming the pixel electrode 82.

Alignment films (not shown) are coated over the top substrate and the bottom substrate, respectively. Then, the two substrates are assembled together, and a liquid crystal is injected between the substrates to thereby fabricate the liquid crystal display shown in FIGS. 3 and 4.

The liquid crystal molecules 151 interposed between the first pixel electrode region 82a bearing a small pretilt angle and the first common electrode region 112a bearing a large pretilt angle are twisted in the first direction 1 to thereby form a first liquid crystal domain. The liquid crystal molecules 152 interposed between the second pixel electrode region 82b bearing a large pretilt angle and the second common electrode region 112b bearing a small pretilt angle are twisted in the second direction 2 to thereby form a second liquid crystal domain. Consequently, two liquid crystal domains are present within one pixel region.

As described above, in one pixel region, the liquid crystal molecules at a predetermined region of the bottom substrate bear a large pretilt angle, and those at the corresponding region of the top substrate bear a small pretilt angle, whereas the liquid crystal molecules at another region of the bottom substrate bear a small pretilt angle, and those at the corresponding region of the top substrate bear a large pretilt angle. In this way, a multi domain structure is formed in one pixel region pursuant to the different pretilt angles of the liquid crystal molecules at the top and the bottom substrates, serving to improve wide viewing angle characteristic of the resulting display device.

Figure 18A:
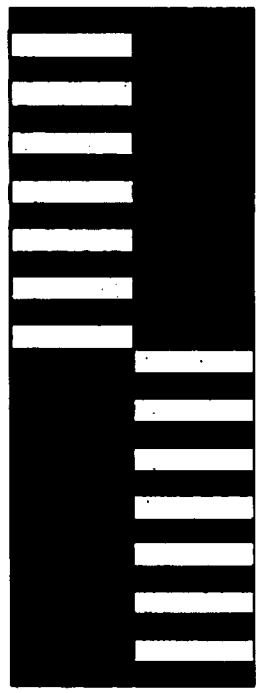
FIGS. 18A, 18B and 18C illustrate mask patterns used for fabricating the liquid crystal display shown in FIG. 2.
Figure 18B:
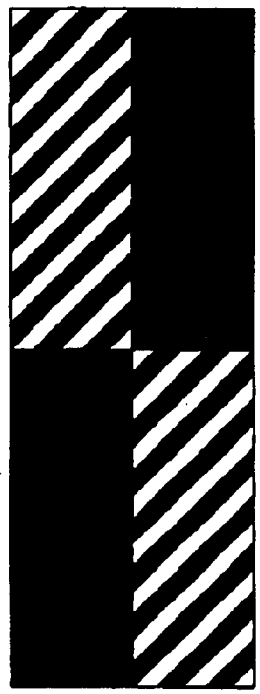
Figure 18C:
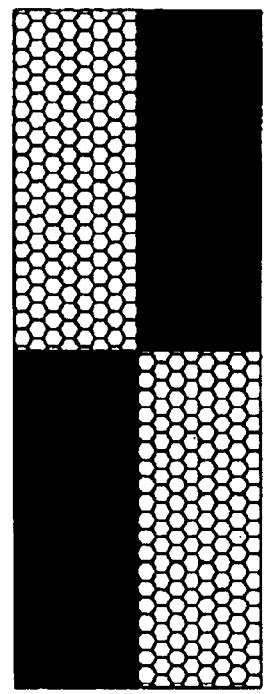

Furthermore, the mask for forming the pixel electrode may bear the patterns shown in. FIGS. 18A, 18B and 18C. Those figures illustrate samples of the mask patterns for the pixel electrode area.

The mask pattern to be placed over the pixel electrode area may be quadruple-partitioned in horizontal and vertical directions while alternately placing the semitransparent pattern portion 200a and the opaque pattern portion 200b side by side.

The semitransparent pattern portion 200a may be formed with a slit pattern. When the slit pattern proceeds in the horizontal direction, a mask shown in FIG. 18A may be produced. When the slit pattern proceeds in the inclined direction, a mask shown in FIG. 18B may be produced. Furthermore, in case the semitransparent pattern portion 200a is formed with a lattice pattern, a mask shown in FIG. 18C may be produced.

When the pixel electrode are patterned using the masks shown in FIGS. 18A, 18B and 18C, four liquid crystal domains can be formed in one pixel region. Of course, in this case, the common electrode is also patterned such that its patterns correspond inversely to the pixel electrode patterns.

Figure 19:
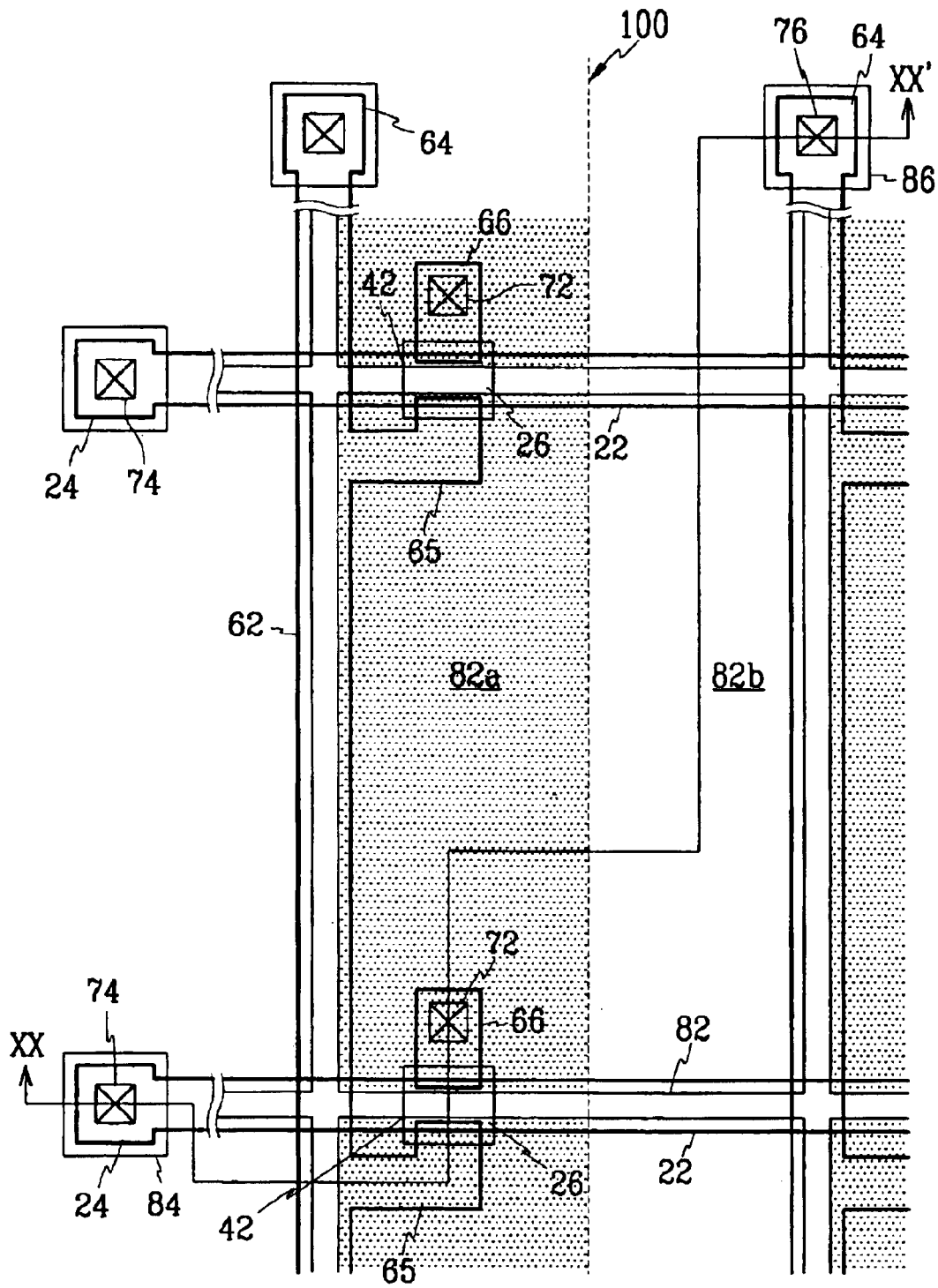
FIG. 19 is a plan view of a liquid crystal display according to a second preferred embodiment of the present invention.
Figure 20:
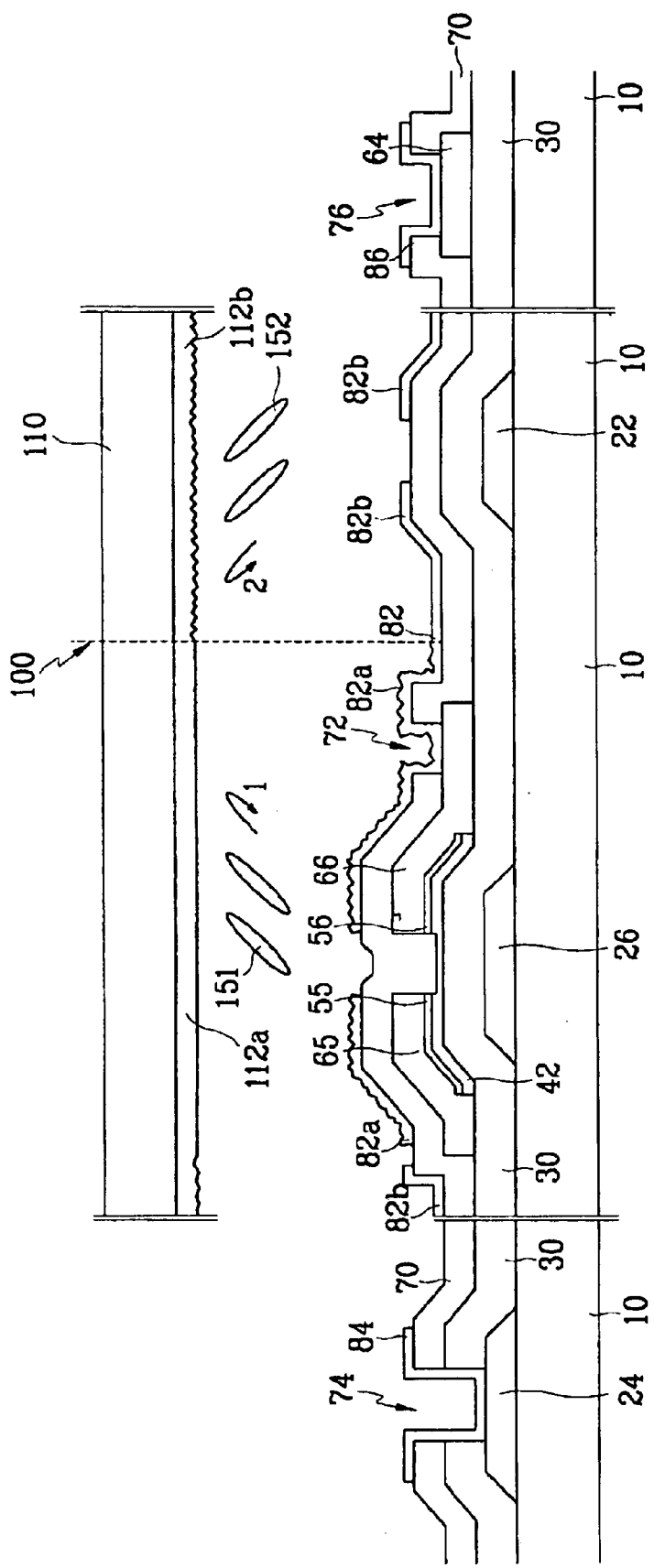
FIG. 20 is a cross sectional view of the liquid crystal display taken along the XX–XX' line of FIG. 19.

FIG. 19 is a plan view of a liquid crystal display according to a second preferred embodiment of the present invention, and FIG. 20 is a cross sectional view of the liquid crystal display taken along the XX–XX' line of FIG. 19.

A gate wire is formed on an insulating substrate 10. The gate wire includes gate line 22 proceeding in the horizontal direction, gate pad 24, and gate electrode 26.

The gate wire may be formed with a single-layered structure, or a multiple-layered structure. It is preferable that the gate wires are formed with a low resistance metallic material. In a single-layered structure, the gate wire may be formed with a metallic material based on chrome or chrome alloy, molybdenum or molybdenum alloy, aluminum or aluminum alloy, or, silver or silver alloy. In a double-layered structure, at least one layer may be formed with a low resistance metallic material.

A gate insulating layer 30 is formed on the substrate 10 with the gate wire using an insulating material such as silicon nitride.

A semiconductor pattern 42 consisting of semiconductor material such as amorphous silicon is formed on the gate insulating layer 30 to overlap the gate electrode 26. Ohmic contact patterns 55 and 56 consisting of impurity-doped semiconductor are formed on the semiconductor pattern 42.

A data wire formed on the ohmic contact pattern 55 and 56 and the gate insulating layer 30. The data wire includes data line 62, data pad 64, source electrode 65 branched from the data line 62 to form thin film transistor and contacting one portion of the ohmic contact pattern 55, and drain electrode 66 facing the source electrode 65 to form the thin film transistors while contacting the opposite-side portion 56 of the ohmic contact pattern.

The data wire may be formed with a single-layered structure, or a multiple-layered structure. It is preferable that the data wire should be formed with a low resistance metallic material. In a single-layered structure, the data wire may be formed with a metallic material such as chrome, molybdenum, aluminum, and silver. In a double-barreled structure, at least one layer should be formed with a low resistance metallic material.

A protective layer 70 is formed on the substrate 10 with an inorganic insulating material such as silicon nitride or an organic insulating material such as benzocyclo butenpe (BCB) while covering the data wire.

The protective layer 70 is provided with first contact hole 72 exposing the drain electrode 66, second contact hole 74 exposing the gate pad 24 together with the gate insulating layer 30, and third contact hole 76 exposing the data pad 64.

Pixel electrode 82 connected to the drain electrode 66 through the first contact hole 72, and subsidiary gate and data pad 84 and 86 connected to the gate and the data pad 24 and 64 through the second and the third contact hole 74 and 76.

The pixel electrode 82 may be formed with a transparent conductive material such as ITO or IZO.

The pixel electrode 82 is patterned such that the one-sided portion with respect to the center line 100 has a rough surface. That is, the pixel electrode 82 has a first pixel electrode region 82a with a rough surface and a second pixel electrode region 82b with a smooth surface.

As described earlier, the surface roughness of the pixel electrode 82 is related to the pretilt angles of the liquid crystal molecules. The first pixel electrode region 82a with a rough surface bears a small pretilt angle, whereas the second pixel electrode region 82b with a smooth surface bears a large pretilt angle.

A common electrode 112 corresponding to the pixel electrode 82 is formed at a top substrate 110. As shown in FIG. 20, the surface roughness of the common electrode 112 is symmetrical to that of the pixel electrode 82. That is, the common electrode 112 has a first common electrode region 112a with a smooth surface that corresponds to the first pixel electrode region 82a with a rough surface, and a second common electrode region 112b with a rough surface that corresponds to the second pixel electrode region 82b with a smooth surface. Therefore, the first common electrode region 112a bears a large pretilt angle, whereas the second common electrode region 112b bears a small pretilt angle.

The liquid crystal molecules 151 interposed between the first pixel electrode region 82a bearing a small pretilt angle and the first common electrode region 112a bearing a large pretilt angle are twisted in the first direction 1 pursuant to the pretilt angle of the first common electrode region 112a to thereby form a first liquid crystal domain. By contrast the liquid crystal molecules 152 interposed between the second pixel electrode region 82b bearing a large pretilt angle and the second common electrode region 112b bearing a small pretilt angle are twisted in the second direction 2 pursuant to the pretilt angle of the second pixel electrode region 82b to thereby form a second liquid crystal domain. That is, two liquid crystal domains that are twisted in different directions are present in one pixel region.

As described above, in one pixel region, the liquid crystal molecules at a predetermined region of the bottom substrate bear a large pretilt angle, and those at the corresponding region of the top substrate bear a small pretilt angle, whereas the liquid crystal molecules at another region of the bottom substrate bear a small pretilt angle, and those at the corresponding region of the top substrate bear a large pretilt angle. In this way, a multi domain structure is formed in one pixel region pursuant to the different pretilt angles of the liquid crystal molecules at the top substrate and the bottom substrate, serving to improve wide viewing angle characteristic of the resulting display device.

A method for fabricating the bottom substrate will be now explained with reference to FIGS. 21A, 21B, 22A, 22B, 23A, 23B, 24A, 24B, 25A, 25B, 26, 27, 28 and 29.

Figure 21A:
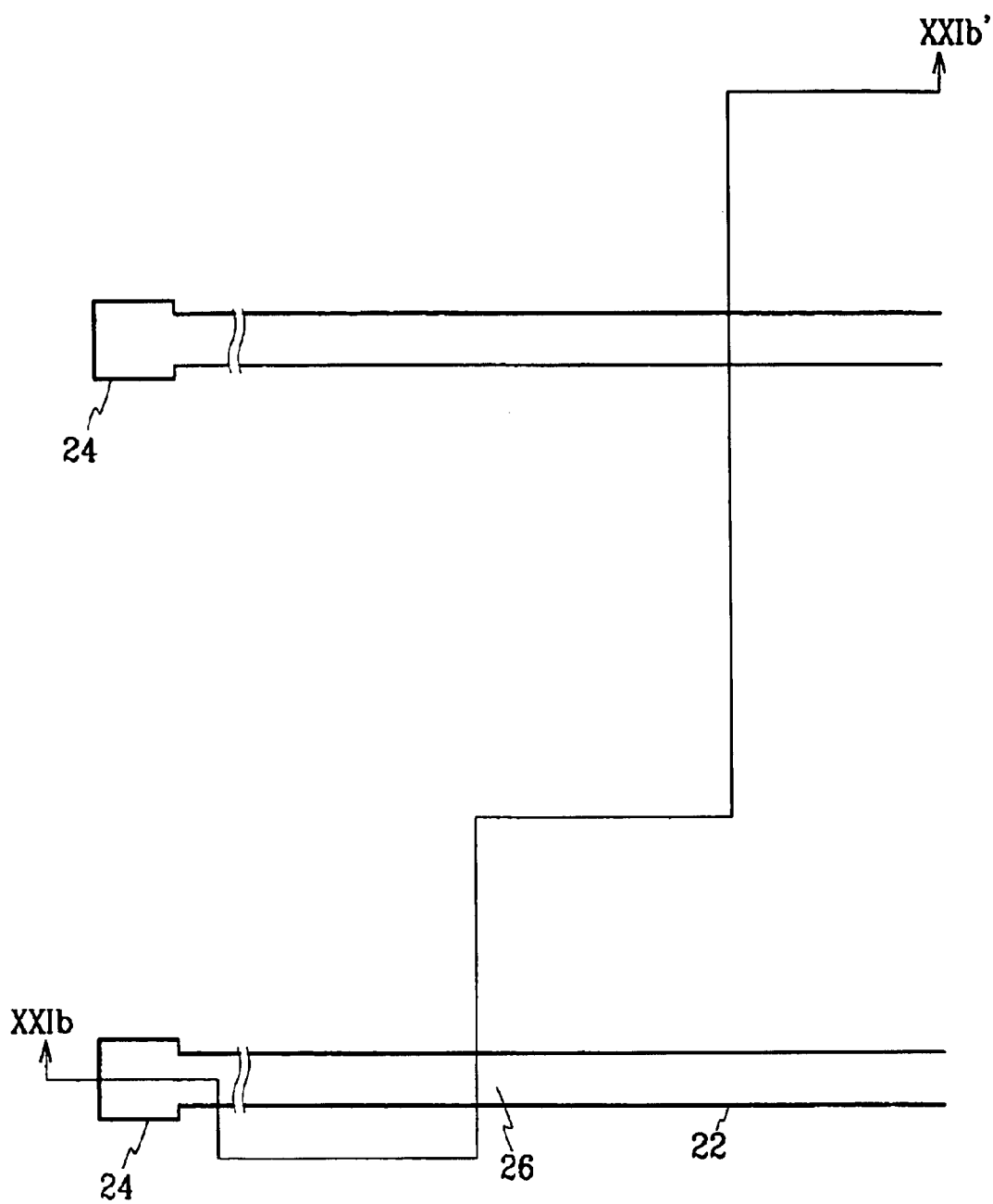
FIGS. 21A through 29 sequentially illustrate the steps of fabricating the liquid crystal display shown in FIG. 19.
Figure 21B:
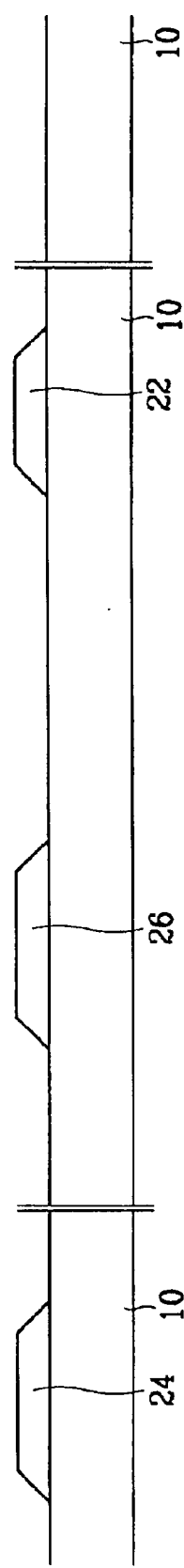

As shown in FIGS. 21A and 21B, a low resistance metallic layer is deposited on an insulating substrate 10, and etched through photolithography to thereby form a gate wire. The gate wire includes gate line 22, gate pad 24, and gate electrode 26.

At this time, two or more metallic layers may be deposited on the substrate 10, and etched through photolithography to thereby form a gate wire with a multiple-layered structure.

Figure 22A:
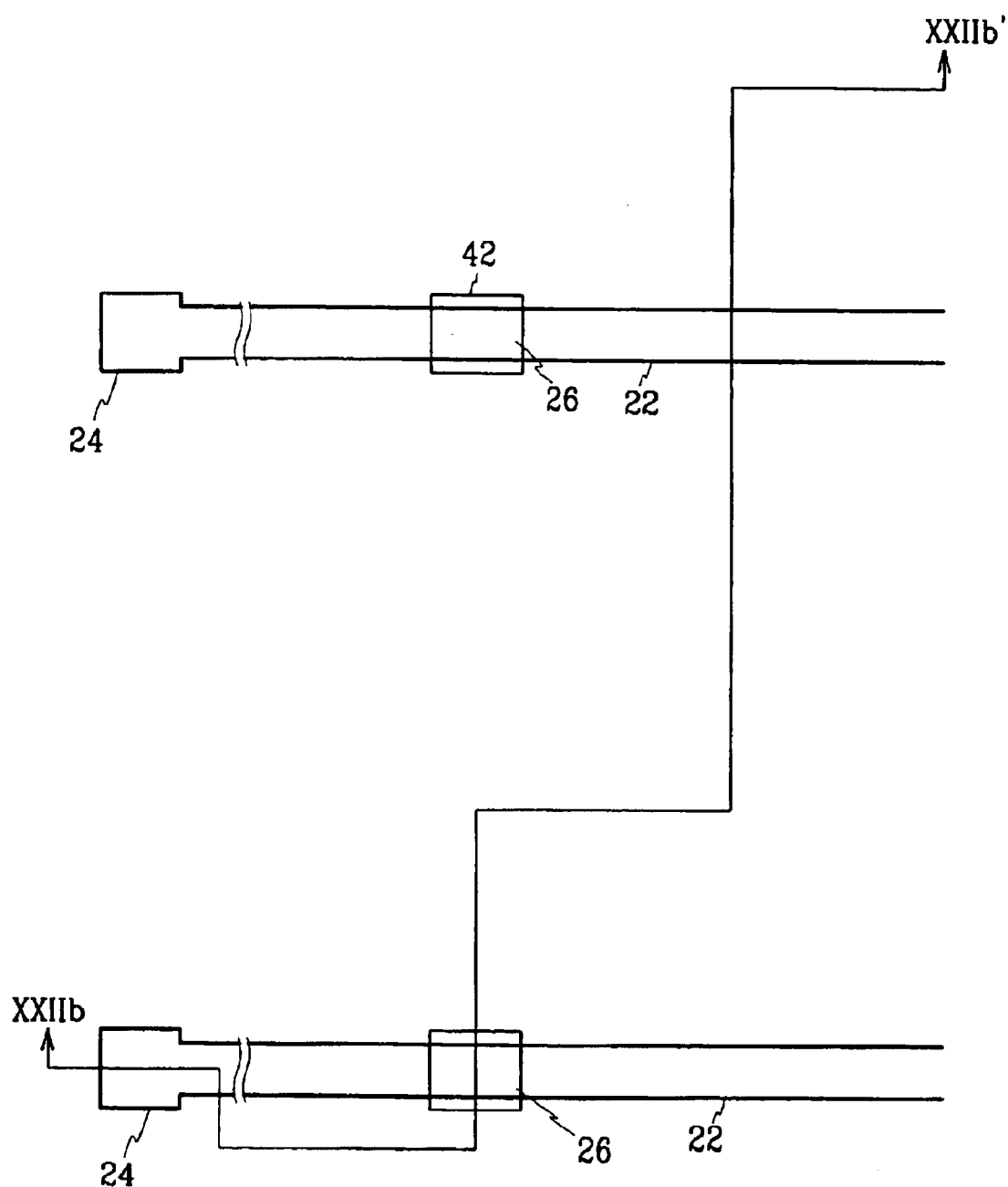
Figure 22B:
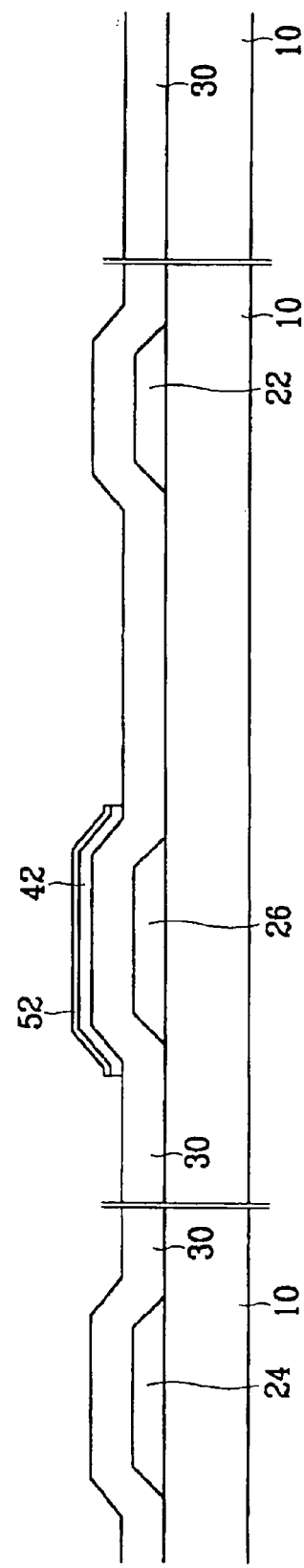

Thereafter, as shown in FIGS. 22A and 22B, a gate insulating layer 30, a semiconductor layer, and an impurity-doped semiconductor layer are sequentially deposited over the resultant substrate comprising the gate wire. The doped semiconductor layer, and the semiconductor layer are etched through photolithography to thereby form an island-shaped semiconductor pattern 42, and an ohmic contact pattern 52.

Figure 23A:
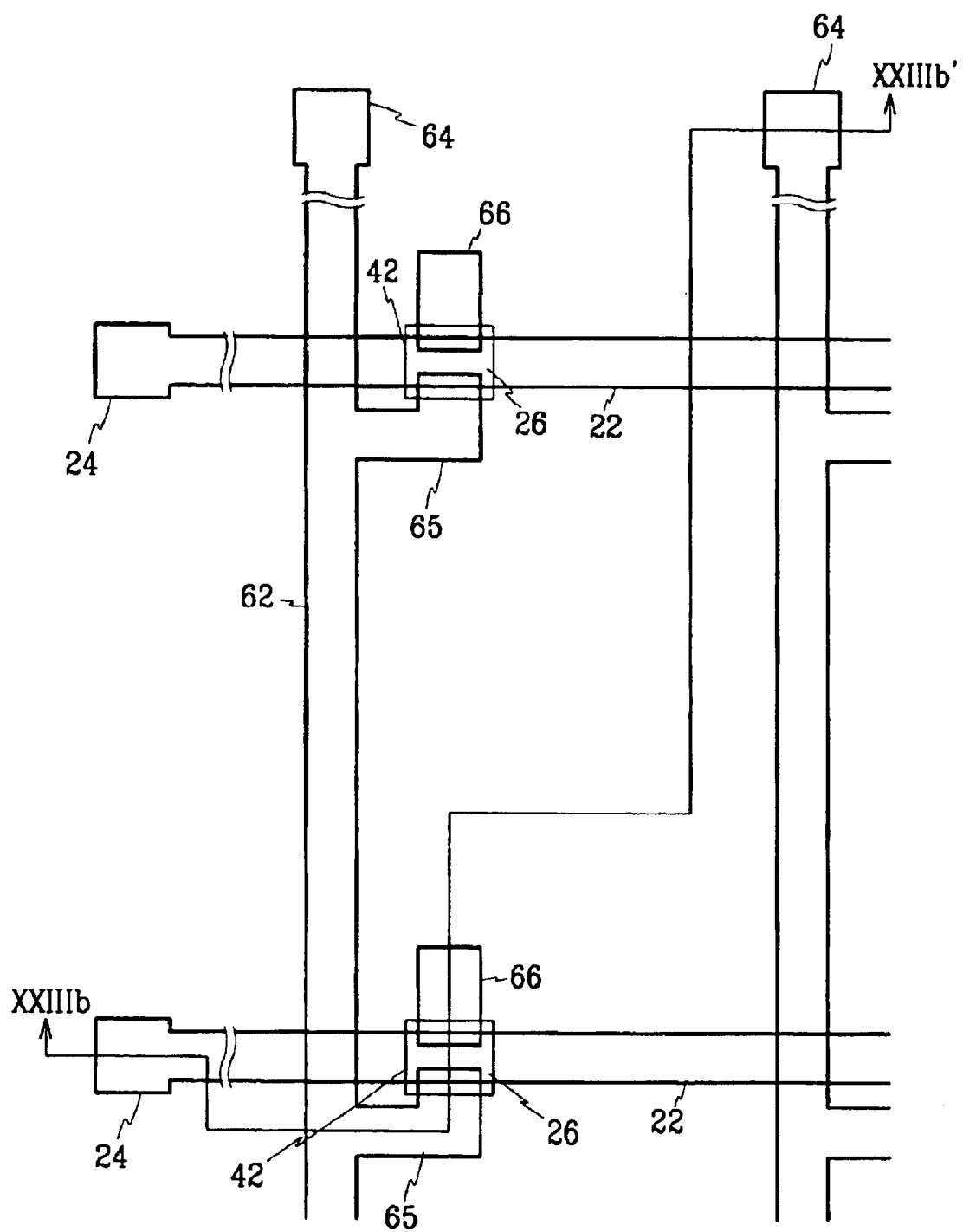
Figure 23B:
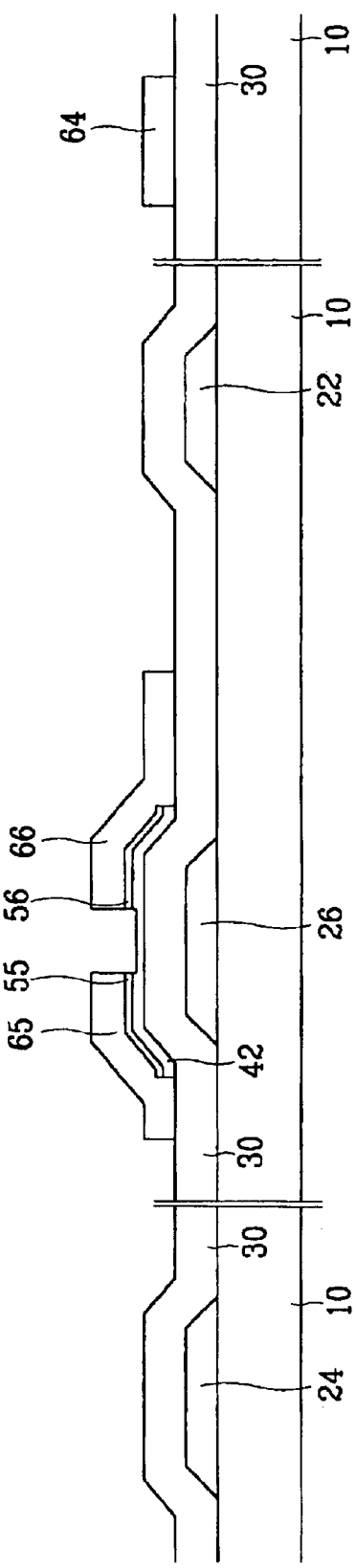

Then, as shown in FIGS. 23A and 23B, a low resistance metallic layer is deposited over the resultant substrate, and etched to thereby form a data wire. The data wire includes data line 62, data pad 64, source electrode 65, and drain electrode 66.

The island-shaped ohmic contact pattern 52 is etched using the source and the drain electrode 65 and 66 as a mask to thereby form a first ohmic contact pattern portion 55 contacting the source electrode 65, and a second ohmic contact pattern portion 56 contacting the drain electrode 66.

Figure 24A:
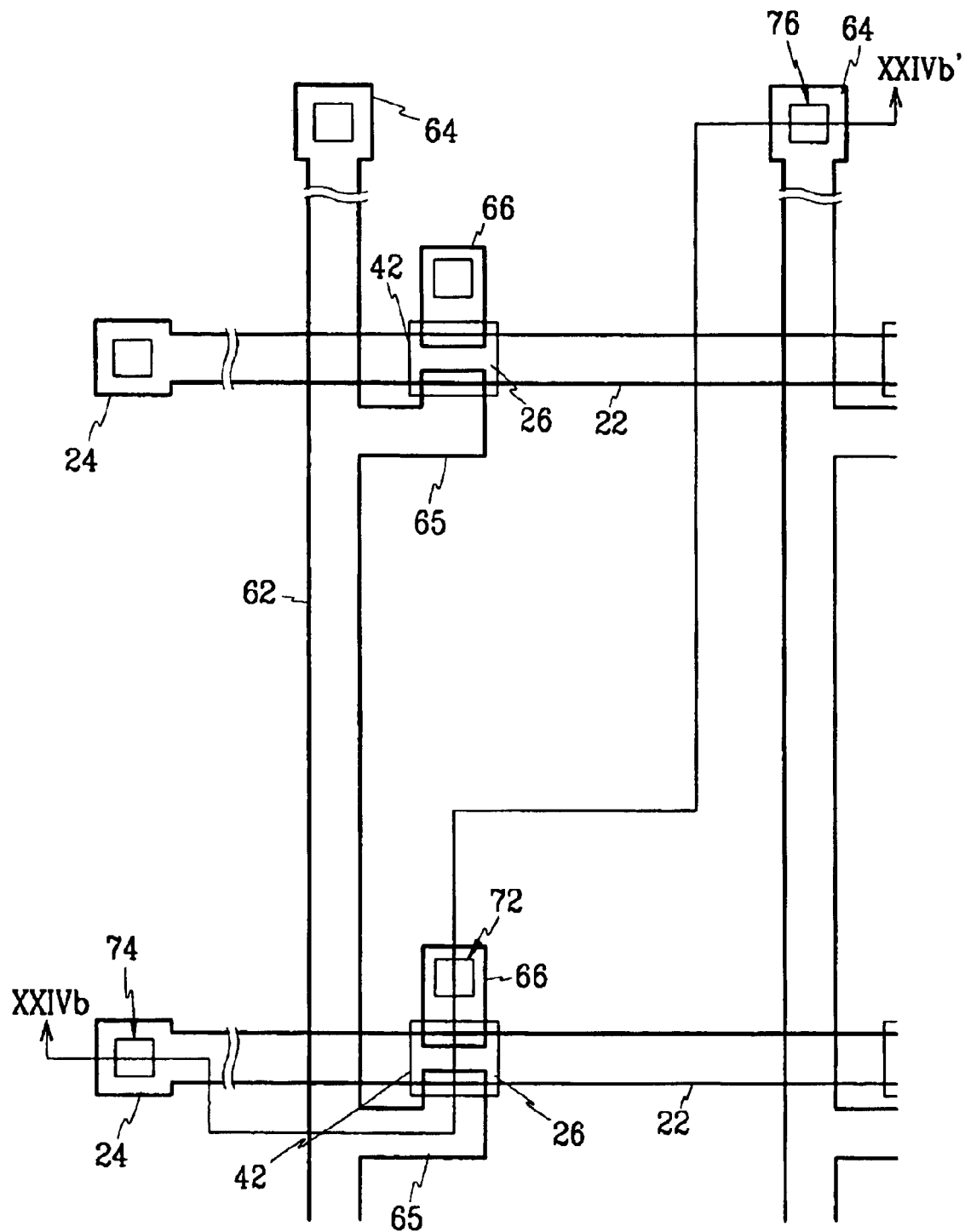
Figure 24B:
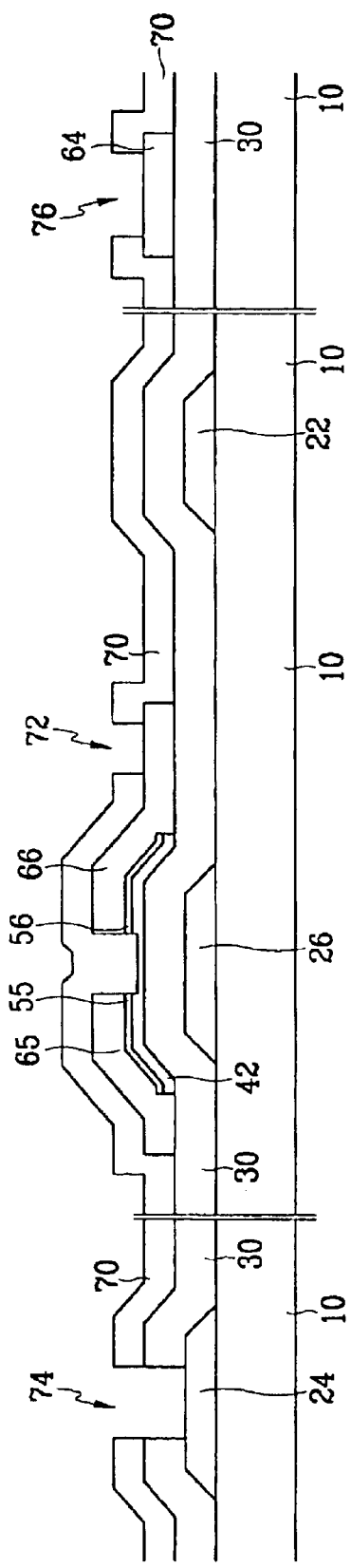

As shown in FIGS. 24A and 24B, a silicon nitride layer or an organic insulating layer is deposited over the resultant substrate comprising the data wire to thereby form a protective layer 70.

First and third contact holes 72 and 76 are formed at the protective layer 70 such that they expose the drain electrode 66 and the data pad 64, and simultaneously, second contact hole 74 are formed at the protecive layer 70 and the gate insulating layer 30 such that they expose the gate pad 24.

Figure 25A:
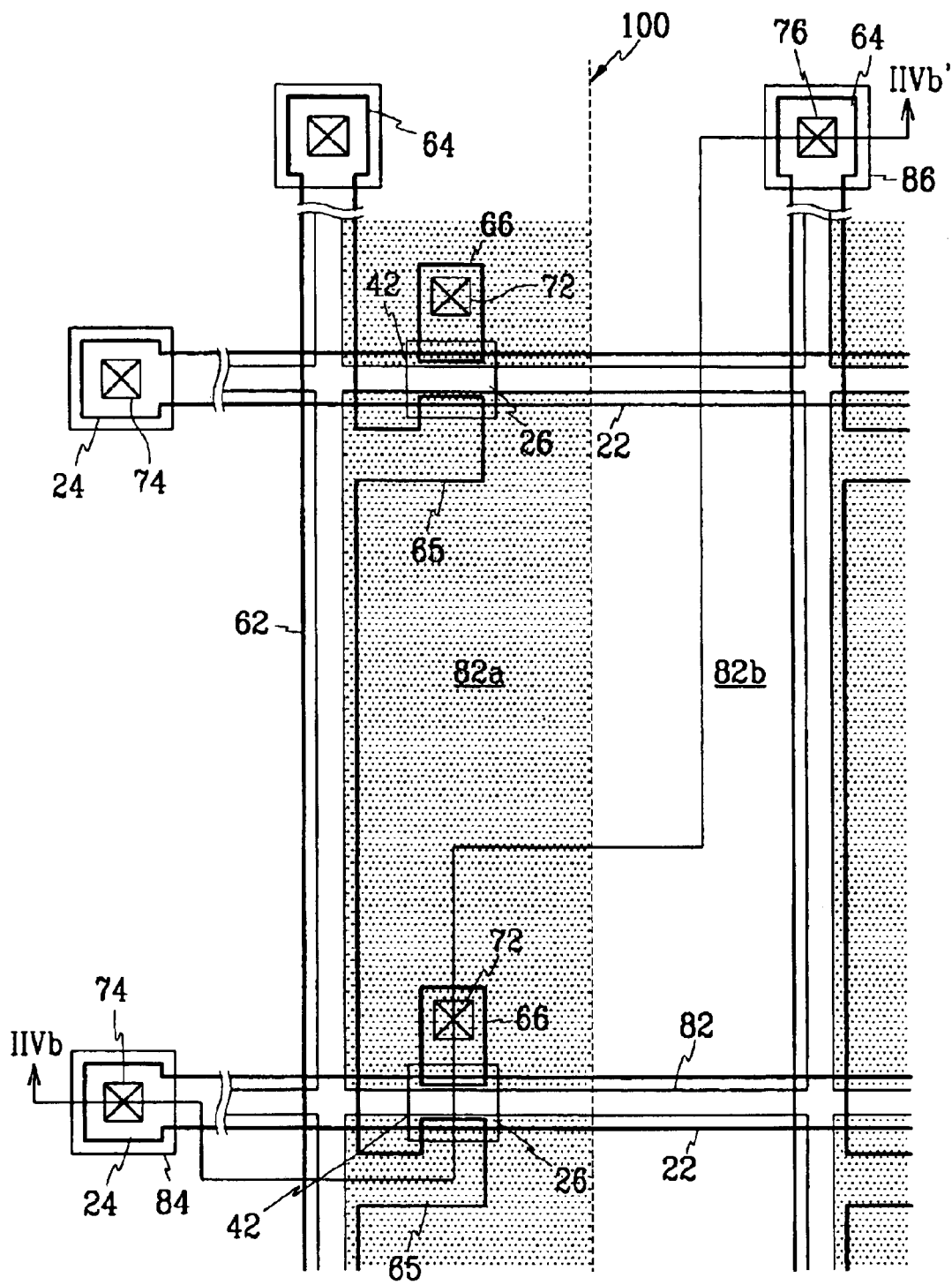
Figure 25B:
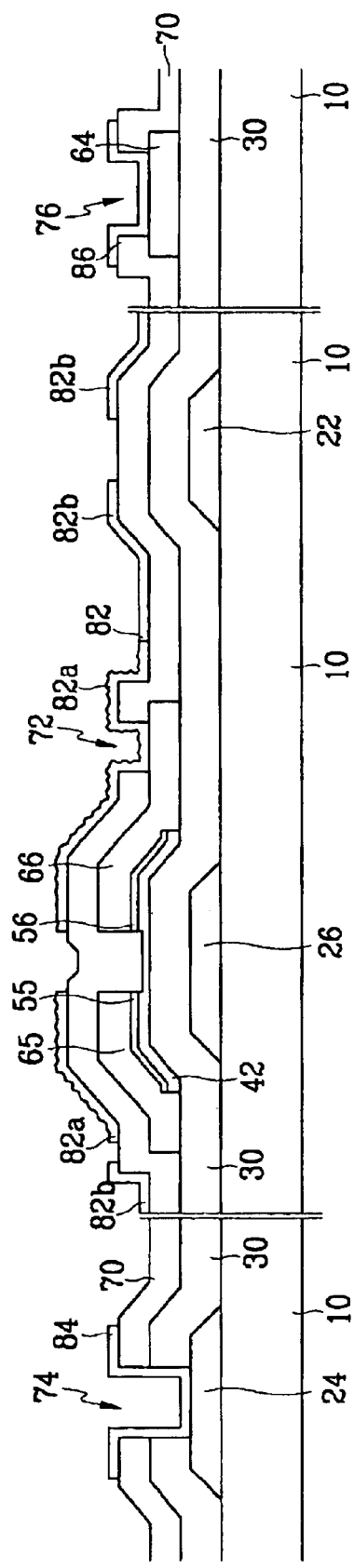

As shown in FIGS. 25A and 25B, a transparent conductive layer based on ITO or IZO is deposited over the resultant substrate and patterned through photolithography to thereby form pixel electrode 82 connected to the drain electrode 66, and subsidiary gate and data pads 84 and 86 connected to the gate and the data pads 24 and 64.

The pixel electrode 82 has portions of different surface roughness. For instance, the pixel electrode 82 is patterned such that it is divided into two regions with respect to the center line 100. That is, the pixel electrode 82 has a first pixel electrode region 82a with a rough surface and a second pixel electrode region 82b with a smooth surface.

Such a pixel electrode may be formed using one mask. This technique will be now explained with, reference to FIGS. 26 through 29.

Figure 26:
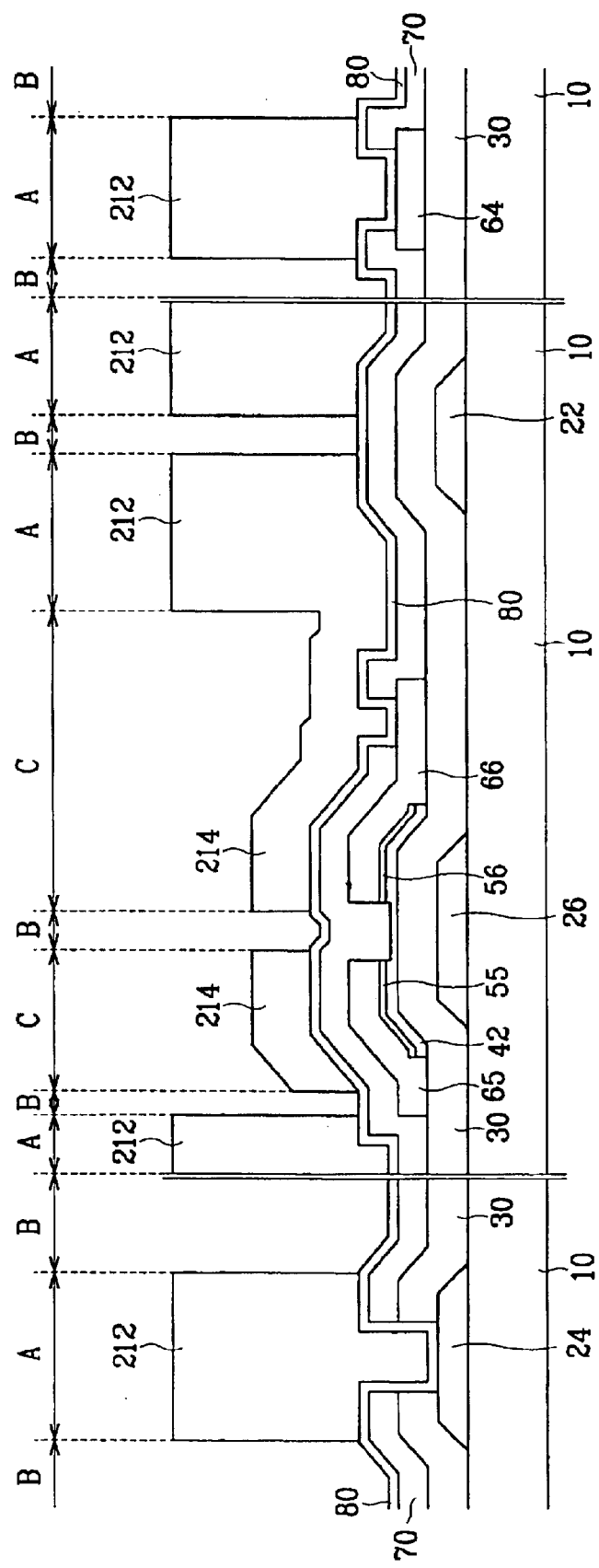

As shown in FIG. 26, a transparent conductive layer 80 based on ITO or IZO is deposited on the resultant substrate comprising the protective layer 70, and a photoresist film is coated on the transparent conductive layer 80.

Thereafter, the photoresist film is exposed to light through a mask, and developed to thereby form a photoresist pattern 212 and 214. At this time, the photoresist pattern has a first photoresist portion 212 placed over the gate pad 84, the data pad 86 and the second pixel electrode region 82b to bear a smooth surface, with a predetermined thickness, and a second photoresist portion 214 placed over the first pixel electrode region 82a to bear a rough surface with a thickness smaller than that of the first photoresist portion 212. The photoresist film over the remaining area is all removed.

Such a photoresist pattern having portions with different thickness may be formed with a mask having portions of different light transmission. Slit pattern, lattice pattern or a semitransparent film is usually formed in the mask to control the light transmission. In the case of using slit pattern or lattice pattern, the distance between one pattern and other pattern is established to be smaller than the resolution of a light exposing device. In the case of using a semitransparent film, thin film having portions of different thickness or light transmissivity may be used to control the light transmission. Such a mask can be fabricated in the wary previously described with reference to FIG. 14.

The mask 200 has a slit or lattice pattern 200a to be placed at the first pixel electrode region 82a to reduce the amount of light illuminated thereto, an opaque pattern 200b to be placed at the second pixel electrode region 82b to block the pass of the light, and a transparent pattern to be placed at the non-pixel electrode area to entirely expose the area to light.

As described earlier, the amount of light transmission can be controlled through varying the opening width or distance of the slit or lattice pattern. When the photoresist film is exposed to light through such a mask, the molecules of the photoresist film at the B area directly exposed to light are completely decomposed, the molecules of the photoresist film at the C area corresponding to the slit pattern or the semitransparent film are decomposed at some degree, and the molecules of the photoresist film at the A area blocked by the light interception film are barely decomposed.

When the selectively light-exposed photoresist film is developed, the resulting photoresist film has portions with different thickness depending upon the molecular decomposition degrees.

Figure 27:
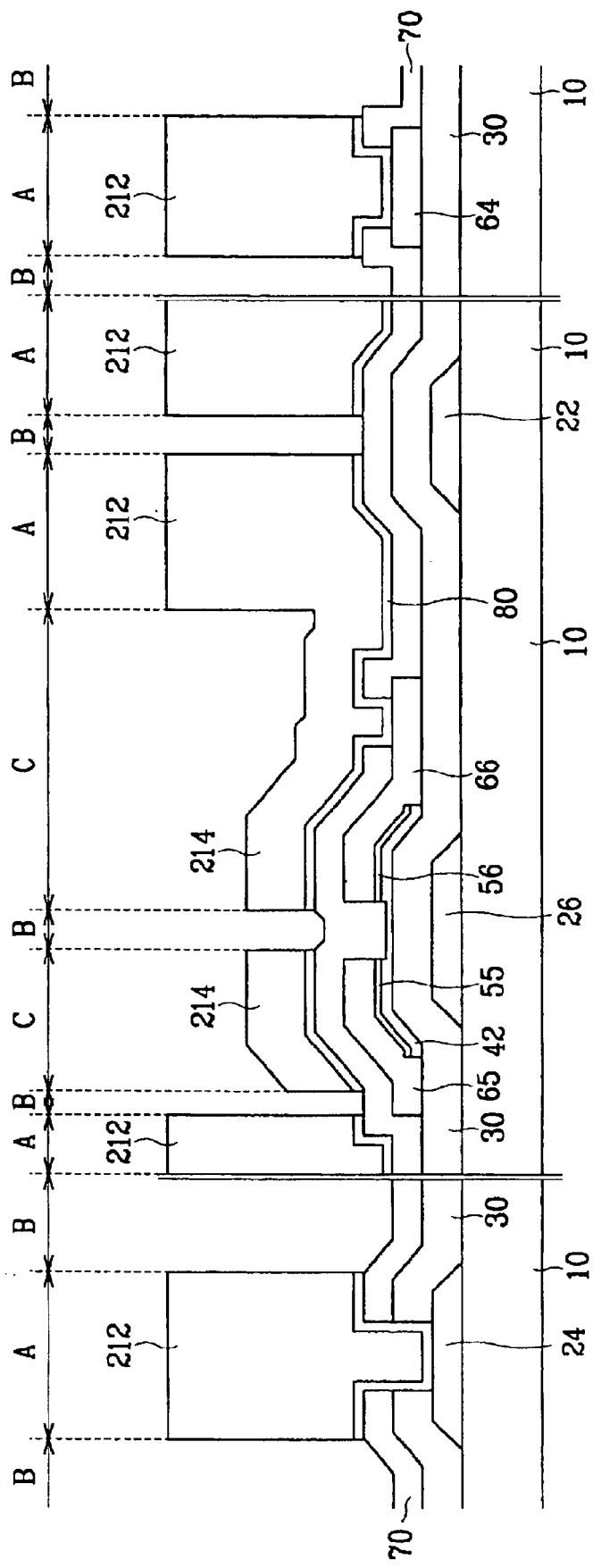

As shown in FIG. 27, the transparent conductive layer 80 is etched using the photoresist pattern 212 and 214 as a mask to thereby form pixel electrode 82, subsidiary gate pad 84 connected to the gate pad 24, and subsidiary data pad 86 connected to the data pad 64. The portion of the transparent conductive layer 80 entirely exposed to light is removed.

Figure 28:
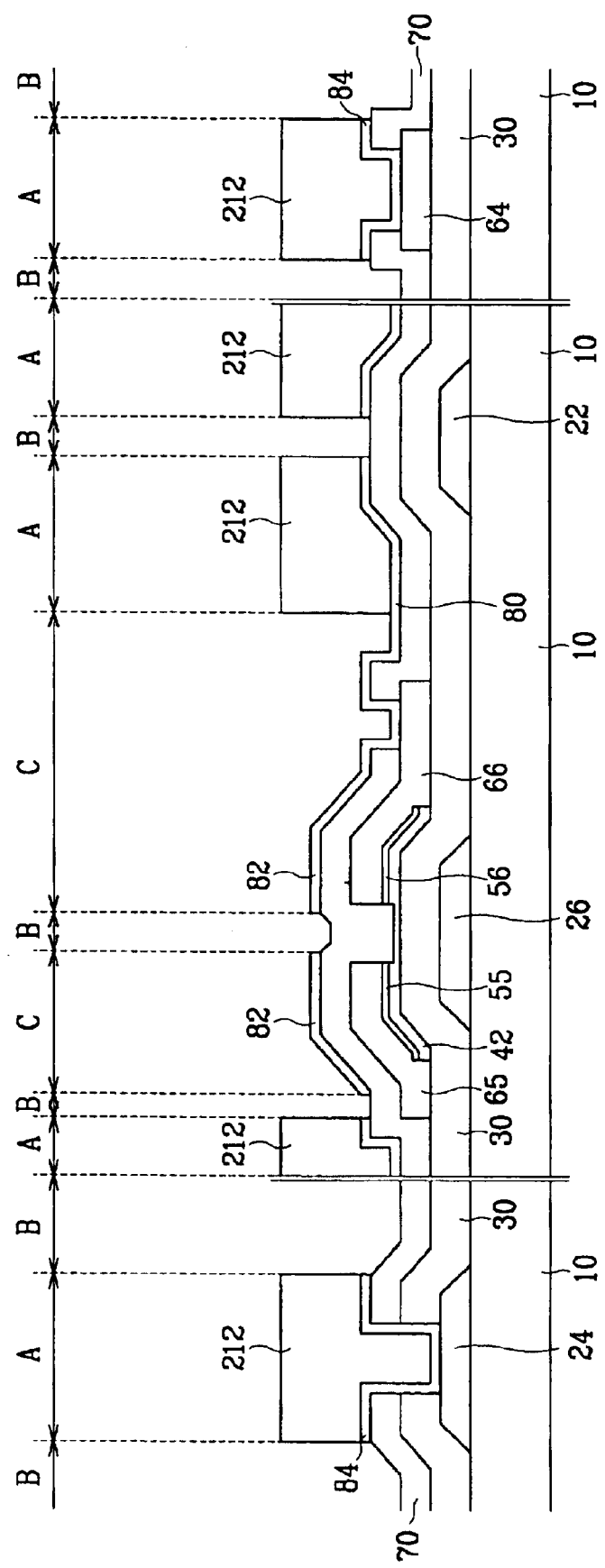

Thereafter, as shown in FIG. 28, the photoresist pattern 212 and 214 is dry-etched such that the second photoresist portion 214 is removed. At this time, $O_2$ may be used for the etching gas. In this process, the second photoresist portion 214 is removed, and the first photoresist portion 212 is reduced in thickness as much as the thickness of the second photoresist portion 214.

When the second photoresist portion 214 is removed, the portion of the pixel electrode 82 to be formed as the first pixel electrode region 82a is exposed to the outside.

Figure 29:
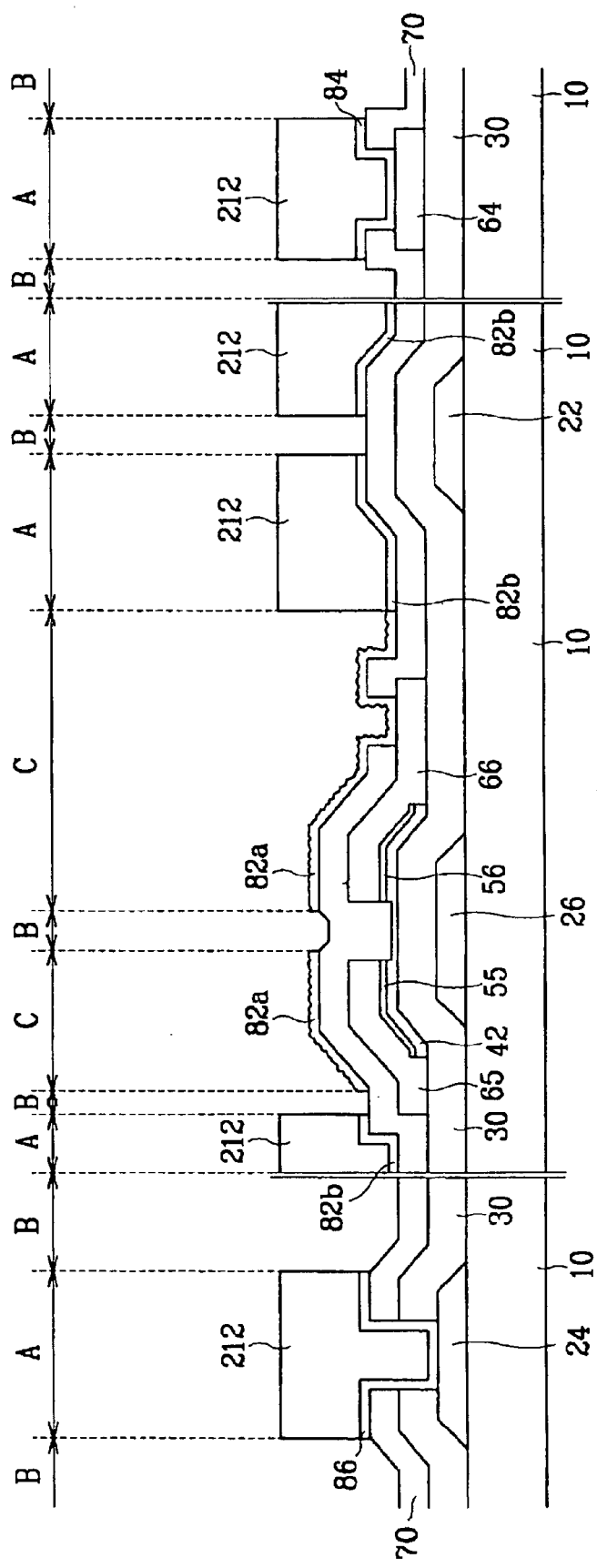

As shown in FIG. 29, the exposed portion of the pixel electrode 82 is surface-treated to roughen the surface. In order to make such a surface treatment, the following technique may be used.

First, inert gas such as argon, neon and crypton may be physically bombarded on the first pixel electrode region 82a to partially remove the surface of the pixel electrode 82. In this case, it is preferable that the time period for using the inert gas or the energy of injecting the inert gas should be controlled to obtain the desired roughness.

Second, the substrate shown in FIG. 28 may be dipped into an etching solution for a predetermined period of time to thereby etch the transparent conductive layer in chemical reaction with the etching solution. In this case, the concentration of the etching solution or the time period for the dipping should be appropriately controlled to obtain the desired roughness.

Then, the remaining first photoresist portion 212 is removed while exposing the underlying second pixel electrode region 82b with a smooth surface. Consequently, as shown in FIG. 24, the pixel electrode 82 having the first pixel electrode region 82a with a rough surface and the second pixel electrode region 82b with a smooth surface is completed.

In this way, the pixel electrode 82 having portions with different surface roughness can be formed using one mask.

A top substrate corresponding to the above-structured bottom substrate can be formed in the following way.

Color filters (not shown) are formed on an insulating substrate 110, and a common electrode 112 based on ITO or IZO covers the color filters. As with the pixel electrode 82, the common electrode 112 is also patterned to partially roughness its surface. The surface roughness of the common electrode 112 symmetrically corresponds to that of the pixel electrode 82. That is, the common electrode 112 has a first common electrode region 112a with a smooth surface that corresponds to the first pixel electrode region 82a with a rough surface, and a second common electrode region 112b with a rough surface that corresponds to the second pixel electrode region 82b with a smooth surface. Therefore, the first common electrode region 112a bears a large pretilt angle, whereas the second common electrode region 112b bears a small pretilt angle.

Such a common electrode 112 can be also formed using one mask in the same way as forming the pixel electrode 82.

Alignment layer (not shown) are coated over the top substrate and the bottom substrate, respectively. Then, the two substrates are assembled together, and a liquid crystal is injected between the substrates to thereby fabricate the liquid crystal display shown in FIG. 20.

The liquid crystal molecules 151 interposed between the first pixel electrode region 82a bearing a small pretilt angle and the first common electrode region 112a bearing a large pretilt angle are twisted in the first direction 1 to thereby form a first liquid crystal domain. The liquid crystal molecules 152 interposed between the second pixel electrode region 82b bearing a large pretilt angle and the second common electrode region 112b bearing a small pretilt angle are twisted in the second direction 2 to thereby form a second liquid crystal domain. Consequently, two liquid crystal domains are present in one pixel region.

As described above, the liquid crystal molecules at a predetermined region of the bottom substrate within one pixel area bear a large pretilt angle, and those at the corresponding region of the top substrate bear a small pretilt angle, whereas the liquid crystal molecules at another region of the bottom substrate within the pixel area bear a small pretilt angle, and those at the corresponding region of the top substrate bear a large pretilt angle. In this way, a multi domain structure is formed at one pixel area pursuant to the different pretilt angles of the liquid crystal molecules at the top substrate and the bottom substrate, serving to improve wide viewing angle characteristic of the resulting display device.

Attentively, it may be proposed that the liquid crystal molecules at a predetermined region of the bottom substrate bear a large pretilt angle, and those at another region of the bottom substrate within the pixel area bear a small pretilt angle, whereas all of the liquid crystal molecules at the top substrate within the corresponding pixel area bear a pretilt angle being medium between the large pretilt angle and the small pretilt angle. In this case, a multi domain structure is also formed at one pixel area pursuant to the different pretilt angles of the liquid crystal molecules at the top and bottom substrates.

This structure will be now explained in relation to third and fourth preferred embodiments of the present invention.

Figure 30:
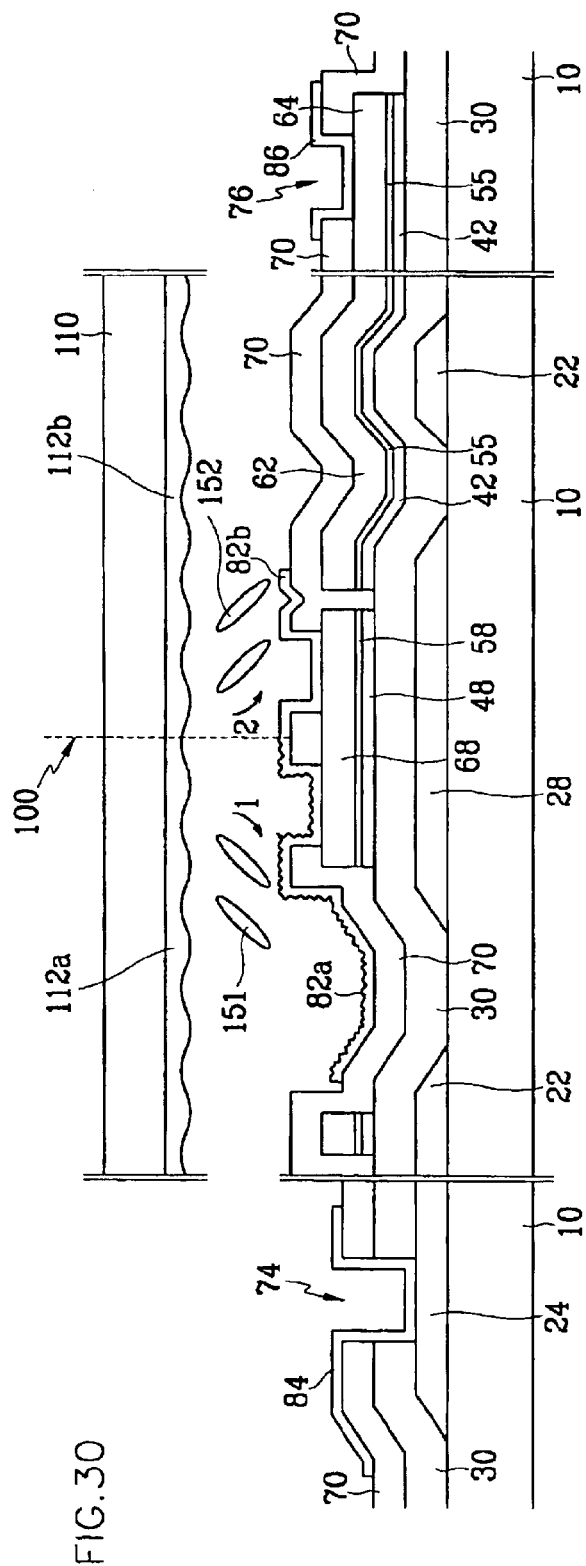
FIGS. 30 and 31 are sectional views of a liquid crystal display according to a third preferred embodiment of the present invention.
Figure 31:
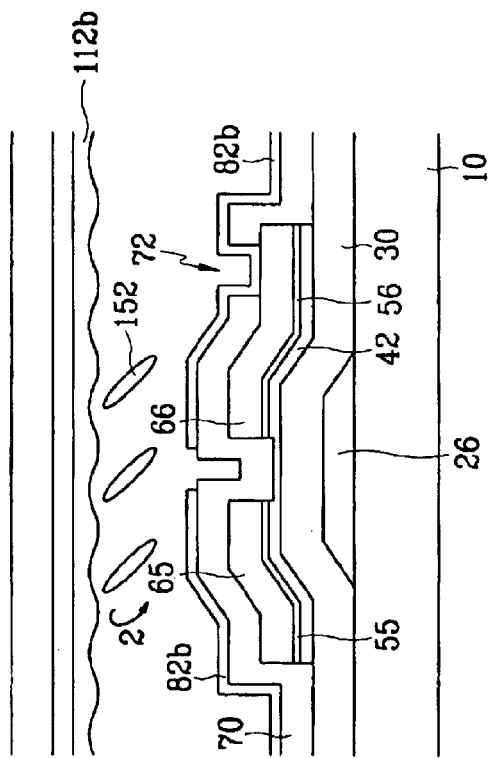

FIGS. 30 and 31 are sectional views of a liquid crystal display according to a third preferred embodiment of the present invention, which is an embodiment of changing the first embodiment of the present invention.

In this preferred embodiment, other components and structures of the top and the bottom substrates are the same as the those related to the first preferred embodiment except that a common electrode 112 formed at the top substrate has a different structure. That is, the entire surface of the common electrode 112 bears a surface roughness being medium between the surface roughness of the first pixel electrode region 82a and the surface roughness of the second pixel electrode region 82b.

In this case, the liquid crystal molecules 151 interposed between the first pixel electrode region 82a bearing a small pretilt angle and the common electrode 112 bearing a medium pretilt angle are twisted in the first direction 1 pursuant to the pretilt angle of the common electrode 112 to thereby form a first liquid crystal domain, whereas the liquid crystal molecules 152 interposed between the second pixel electrode region 82b bearing a large pretilt angle and the common electrode 112 bearing a medium pretilt angle twisted in the second direction 2 pursuant to pretilt angle of the common electrode 112 to thereby form a second liquid crystal domain. Therefore, two liquid crystal domains that are twisted in different directions are present in one pixel region.

In order to make the surface roughness of the common electrode 112 to be medium between the surface roughness of the first pixel electrode region 82a and the surface roughness of the second pixel electrode region 82b, a layer for the common electrode 112 is deposited over the substrate, and its surface is treated. Such a surface treatment is performed in the same way as with the pixel electrode 82 related to the first preferred embodiment.

That is, inert gas may be bombarded oh the surface of the target layer to partially remove the surface thereof in a physical manner. Alternatively, the top substrate may be dipped into an etching solution for a predetermine period of time to chemically etch the common electrode layer. The concentration of injection gas as well as the gas injection energy, or the period of time for the dipping should be appropriately controlled to obtain the desired surface roughness.

A technique of controlling the strength of rubbing may be further employed for making the liquid crystal molecules at the top substrate bear the medium pretilt angle. An alignment layer (not shown) is formed on the common electrode 121, and is rubbed. At this time, the rubbing strength is controlled such that grooves with a predetermined depth are formed at the alignment layer. In this way, the liquid crystal molecules at the top substrate can bear a pretilt angle that is in the middle between the large pretilt angle and the small pretilt angle related to the liquid crystal molecules at the bottom substrate.

Accordingly, a separate mask is not required to make the liquid crystal molecules at the common electrode 112 bear the median pretilt angle.

Figure 32:
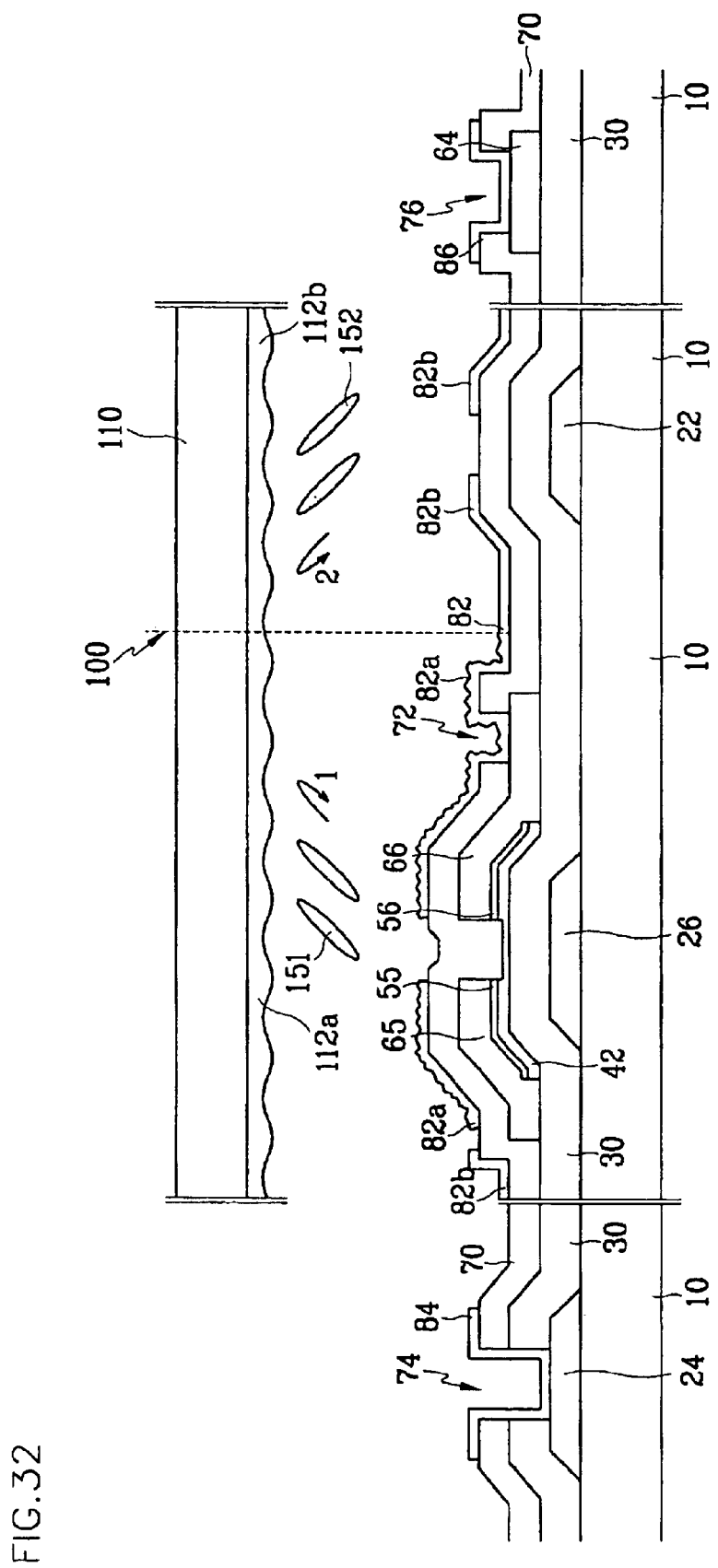
FIG. 32 is a sectional views of a liquid crystal display according to a fourth preferred embodiment of the present invention.

FIG. 32 is a sectional view of a liquid crystal display according to a fourth preferred embodiment of the present invention.

In this preferred embodiment, other components and structures of the top substrate and the bottom substrate are the same as those related to the second preferred embodiment except that a common electrode 112 formed at the top substrate has a different structure. That is the entire surface of the common electrode 112 has a surface roughness that is medium between the surface roughness of the first pixel electrode region 82a and the surface roughness of the second pixel electrode region 82b.

In this case the liquid crystal molecules 151 interposed between the first pixel electrode region 82a bearing a small pretilt angle and the common electrode 112 bearing a median pretilt angle are twisted in the first direction 1 pursuant to the pretilt angle of the common electrode 112 to thereby form a first liquid crystal domain, whereas the liquid crystal molecules 152 interposed between the second pixel electrode region 82a bearing a large pretilt angle and the common electrode 112 bearing a median pretilt angle are twisted in the second direction 2 pursuant to the pretilt angle of the common electrode 112 to thereby form a second liquid crystal domain. Therefore, two liquid crystal domains that are twisted in different directions are present at one pixel In order to make the surface roughness of the common electrode 112 to be medium between the surface roughness of the first pixel electrode region 82a and the surface roughness of the second pixel electrode region 82b, a layer for the common electrode 112 is deposited on the substrate, and the surface is treated. Such a surface treatment is made in the same way as related to the third preferred embodiment.

As described above, in the invention liquid crystal display, a multi domain structure where plural numbers of liquid crystals domains are present in one pixel region is introduced to improve wide viewing angle characteristic. Furthermore, such a multi domain structure can be realized without using an additional mask.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for fabricating a liquid crystal display, comprising the steps of:

forming a bottom substrate that has a first region where liquid crystal molecules bear a first pretilt angle, and a second region where liquid crystal molecules bear a second pretilt angle smaller than the first pretilt angle;

forming a top substrate that faces the bottom substrate with liquid crystal molecules bearing a third pretilt angle, the third pretilt angle being medium between the first pretilt angle and the second pretilt angle; and forming a liquid crystal layer where the liquid crystal layer is sandwiched between the bottom substrate and the top substrate with liquid crystal molecules.

2. The method of claim 1, wherein the bottom substrate is formed through the steps of:

forming a gate wire, a data wire and a thin film transistor on a first insulating substrate such that the data wire crosses over the gate wire while being insulated from the gate wire, and the thin film transistors are electrically connected to the data wire; and forming a pixel electrode such that the pixel electrode are electrically connected to the thin film transistor, each pixel electrode bearing a first surface roughness at the first region while bearing a second surface roughness at the second region, the second surface roughness being higher than the first surface roughness.

3. The method of claim 2, wherein the pixel electrode are formed through the steps of:

depositing a transparent conductive layer over the first substrate;

coating a photoresist film on the transparent conductive layer;

selectively exposing the photoresist film to light using a mask;

forming a photoresist pattern on the transparent conductive layer through developing the light-exposed photoresist film, the photoresist pattern having a first portion placed over the first region of the common electrode with a first thickness, and a second portion placed over the second region of the common electrode with a second thickness larger than the first thickness;

etching the transparent conductive layer using the photoresist pattern as a mask to form a shape of the pixel electrode;

removing the first portion of the photoresist pattern while exposing the underlying transparent conductive layer;

forming the first region of the pixel electrode through treating the surface of the exposed portion of the transparent conductive layer; and forming the second region of the pixel electrode through removing the second portion of the photoresist pattern.

4. The method of claim 3, wherein the surface is treated through bombarding inert gas on the exposed portion of the transparent conductive layer.

5. The method of claim 4 wherein the surface is treated through wet-etching the exposed portion of the transparent conductive layer using a wet etching solution.

6. The method of claim 1, wherein the step of forming the top substrate is made through forming a common electrode on a second insulating substrate such that the common electrode corresponding to the pixel electrode with a third surface roughness, the third surface roughness being medium between the first surface roughness and the second surface roughness.

7. The method of claim 6, wherein the common electrode is formed through the steps of:
   depositing a transparent conductive layer over the second substrate; and
   treating surface of the transparent conductive layer such that the transparent conductive layer bears the third surface roughness.

8. The method of claim 7, wherein the surface is treated through bombarding inert gas on the exposed portion of the transparent conductive layer.

9. The method of claim 8, wherein the surface is treated through wet-etching the exposed portion of the transparent conductive layer.

10. The method of claim 1, wherein the top substrate is formed through the steps of:
    forming a common electrode over a second insulating substrate such that the common electrode corresponds the pixel electrode;
    coating an alignment layer covering the common electrode; and
    rubbing the alignment layer such that the liquid crystal molecules at the top substrate bear the third pretilt angle.

11. The method of claim 1, wherein the liquid crystal molecules are twisted in a first direction a the first region, and the liquid crystal molecules are twisted in a second direction at the second region.

* * * * *